United States Patent
Murakawa et al.

(10) Patent No.: US 6,788,829 B1
(45) Date of Patent: Sep. 7, 2004

(54) IMAGE PROCESSING APPARATUS AND METHOD FOR RECOGNIZING SPECIFIC PATTERN AND RECORDING MEDIUM HAVING IMAGE PROCESSING PROGRAM RECORDED THEREON

(75) Inventors: Akira Murakawa, Toyonaka (JP); Keisuke Hashimoto, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/538,743

(22) Filed: Mar. 30, 2000

(30) Foreign Application Priority Data

| Mar. 31, 1999 | (JP) | 11-092061 |
| Mar. 31, 1999 | (JP) | 11-092072 |
| Mar. 31, 1999 | (JP) | 11-092085 |

(51) Int. Cl.[7] ............................................. G06K 9/00
(52) U.S. Cl. ..................... 382/305; 382/181; 382/291; 358/403
(58) Field of Search ................. 382/141, 151, 382/178, 180, 181, 190, 204, 205, 254, 260, 291, 305; 348/87, 94; 358/403; 707/1–10

(56) References Cited

U.S. PATENT DOCUMENTS

| 4,334,241 A | * | 6/1982 | Kashioka et al. | |
| 5,572,602 A | | 11/1996 | Naoi et al. | 382/178 |
| 5,625,717 A | | 4/1997 | Hashimoto et al. | 382/260 |
| 5,696,838 A | * | 12/1997 | Chiu et al. | |
| 5,913,220 A | * | 6/1999 | Takahashi | |
| 6,302,329 B1 | * | 10/2001 | Iwai et al. | |
| 6,307,963 B1 | * | 10/2001 | Nishida et al. | |
| 6,320,977 B1 | * | 11/2001 | Tokura | |
| 6,327,387 B1 | * | 12/2001 | Naoi et al. | |

OTHER PUBLICATIONS

Hamano "A Similarity Retrieval Method for Image databases Using Simple Graphics", IEEE, pp. 149–154, 1988.*

* cited by examiner

*Primary Examiner*—Daniel Mariam
(74) *Attorney, Agent, or Firm*—Burns, Doane, Swecker & Mathis, L.L.P.

(57) ABSTRACT

The invention provides an image processing apparatus capable of reliably and quickly retrieving, from an image, a pattern ("a layout pattern") including a plurality of elements and being specified based on the relative layout information among the elements. To retrieve the pattern from the image, the apparatus first detects two elements of the specific pattern giving a maximum distance therebetween, specifies positions where the other elements composing the layout pattern together with the two elements should be present based on the positional relationship between the two elements, and recognizes the layout pattern in the image when the other elements are accurately detected in the specified positions.

33 Claims, 19 Drawing Sheets

20f ELEMENT RECOGNIZING FILTER

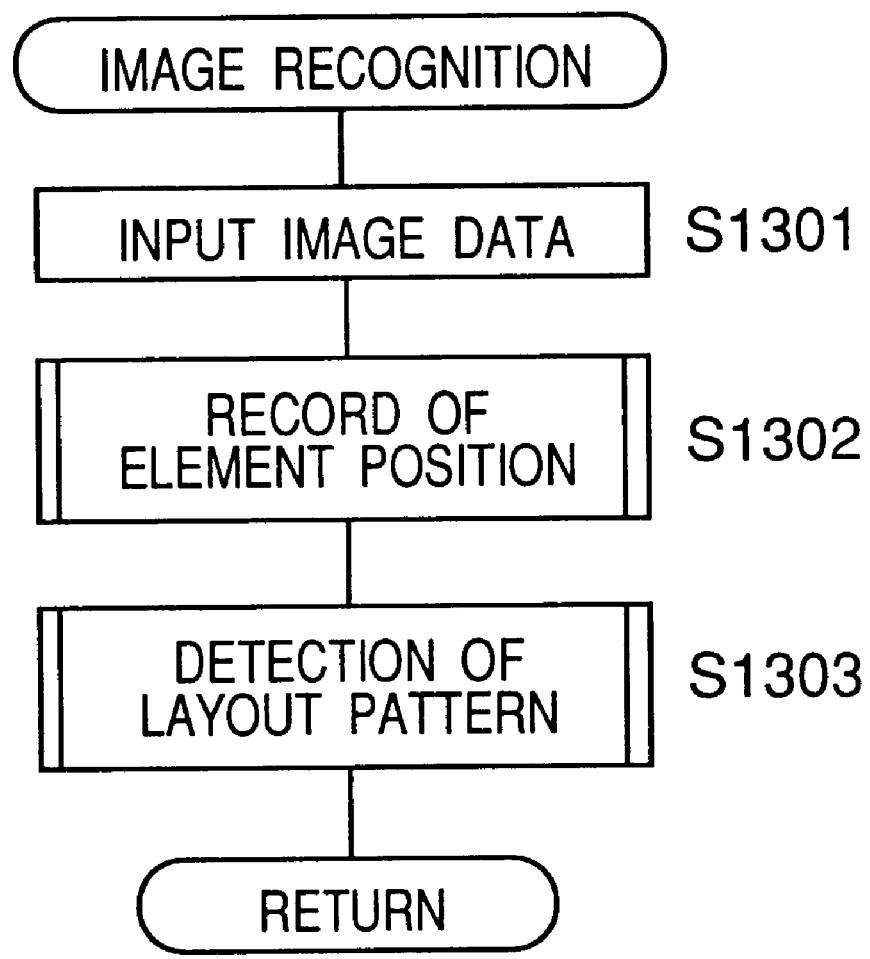

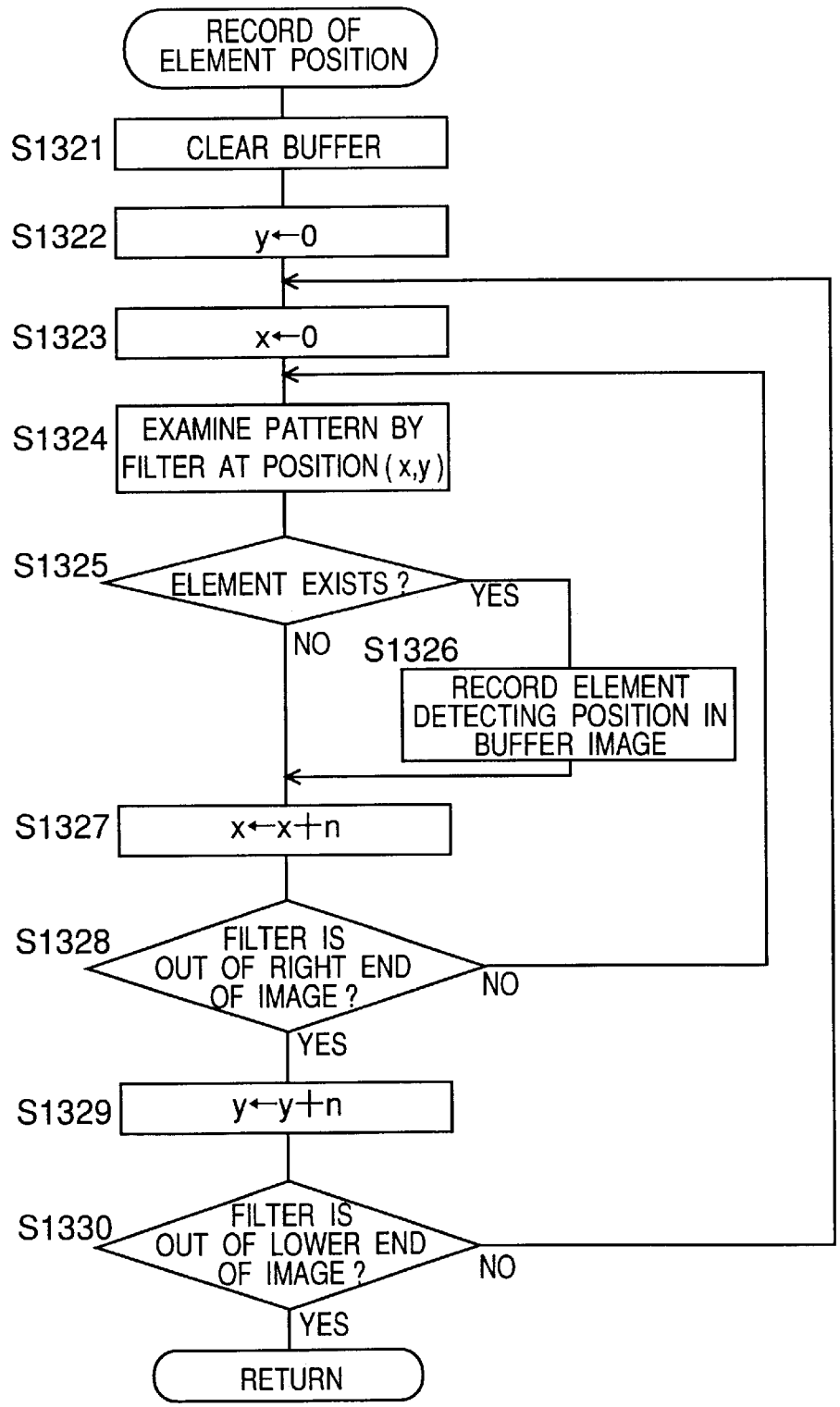

IMAGE PROCESSING APPARATUS AND METHOD FOR RECOGNIZING SPECIFIC PATTERN AND RECORDING MEDIUM HAVING IMAGE PROCESSING PROGRAM RECORDED THEREON

SPECIFICATION

This application is based on applications Nos. 11-92061, 11-92072 and 11-92085 filed in Japan, the contents of which are incorporated herein by reference.

TITLE OF THE INVENTION

Image Processing Apparatus And Method for Recognizing Specific Pattern and Recording Medium Having Image Processing Program Recorded Thereon.

BACKGROUND OF THE INVENTION

1. Technical Field of the Invention

The present invention relates to an image processing technique, and more particularly to a technique for recognizing a specific pattern constituted by a plurality of elements having a predetermined positional relationship with each other.

2. Related Art

Conventionally, the position of a specific pattern included in an image has been detected and a pattern matching process has been carried out to recognize the shape of the specific pattern by storing data on each pixel of an image fetched into a camera or the like as binary data or multivalued data in an image memory and collating, for each pixel, the stored data with data on each pixel of a reference pattern specifying a specific pattern which has been stored in a memory in advance. In this collation, the whole image has been scanned while shifting the reference pattern every pixel for an image retrieving the specific pattern in the x or y direction of the image. In this case, when a specific pattern constituted by a plurality of elements having a predetermined relationship with each other is retrieved, reference patterns including all these specific patterns are prepared for scanning the whole image, thereby performing pattern matching.

In this method, however, the pixel of the image where a specific pattern is to be retrieved and the pixel of the reference pattern are shifted and collated every pixel. Therefore, there has been a problem in that it takes a very long time to collate the patterns. Moreover, when the direction of the specific pattern included in the image is not constant, that is, is not coincident with that of the reference pattern, it is necessary to generate a plurality of reference patterns which are rotated by a predetermined different amount or to prepare a plurality of reference patterns in advance, thereby carrying out the above-mentioned collation for each reference pattern.

SUMMARY OF THE INVENTION

In order to solve the above-mentioned problem, the present invention provides an image processing apparatus and method and a recording medium having an image processing program recorded thereon which can reliably and quickly detect, from an image, a pattern comprising a plurality of elements and being specified by the relative positional relationship between the elements.

In a first aspect of the invention, an image processing apparatus for retrieving a pattern from an image is provided. The pattern comprises a plurality of elements having a specific positional relationship with each other. The apparatus comprises a reference element detecting unit for detecting two of the elements from the image, an element position calculating unit for calculating positions of residual elements other than the two detected elements based on coordinates of the two detected elements, a residual element detecting unit for detecting the residual elements in the positions calculated by the element position calculating unit, and a pattern retrieving unit for retrieving the pattern based on the two elements detected by the reference element detecting unit and the residual elements detected by the residual element detecting unit.

In a second aspect of the invention, an image processing method is provided for retrieving a pattern from an image. The pattern comprises a plurality of elements having a specific positional relationship with each other. The method comprises detecting two of the elements from the image, calculating positions of residual elements other than the two detected elements based on coordinates of the two detected elements, detecting the residual elements in the calculated positions, and retrieving the pattern based on the detected two elements and the detected residual elements.

In a third aspect of the invention, a computer readable recording medium is provided. The recording medium stores a program for controlling the computer to retrieve a pattern from an image. The pattern comprises a plurality of elements having a specific positional relationship with each other. The program is capable of executing the following functions: a reference element detecting function for detecting two of the elements from the image; an element position calculating function for calculating positions of residual elements other than the two detected elements based on coordinates of the two detected elements; a residual element detecting function for detecting the residual elements in the positions calculated by the element position calculating function; and a pattern retrieving function for retrieving the pattern based on the two elements detected by the reference element detecting unit and the residual elements detected by the residual element detecting function.

In a forth aspect of the invention, the apparatus comprises a unit for setting a size of a search region of which a size in a vertical scanning direction is greater than a size of the specific pattern in the direction by a first amount or more, and a size in a horizontal scanning direction is greater than the size of the specific pattern in the direction by a second amount or more, a unit for determining a position of the search region by moving the search region by the first amount in the vertical scanning direction during vertical scanning and moving the search region by the second amount in the horizontal scanning direction during the horizontal scanning, and a unit for retrieving the specific pattern in the search region of which position is determined.

In a fifth aspect of the invention, the method comprises setting a size of a search region of which a size in a vertical scanning direction is greater than a size of the specific pattern in the direction by a first amount or more, and a size in a horizontal scanning direction is greater than the size of the specific pattern in the direction by a second amount or more, determining a position of the search region by moving the search region by the first amount in the vertical scanning direction during vertical scanning and moving the search region by the second amount in the horizontal scanning direction during the horizontal scanning and retrieving the specific pattern in the search region of which position is determined.

In a sixth aspect of the invention, a computer readable recording medium stores the program being capable of executing the following functions: a function for setting a size of a search region of which a size in a vertical scanning direction is greater than a size of the specific pattern in the direction by a first amount or more, and a size in a horizontal scanning direction is greater than the size of the specific pattern in the direction by a second amount or more; a function for determining a position of the search region by moving the search region by the first amount in the vertical scanning direction during vertical scanning and moving the search region by the second amount in the horizontal scanning direction during the horizontal scanning; and a function for retrieving the specific pattern in the search region of which position is determined.

In a seventh aspect of the invention, an image processing apparatus comprises a position detecting unit for detecting positions of the elements from the image, a position information holding unit for holding information about the positions of the elements which are detected by the position detecting unit and a pattern specifying unit for retrieving elements on the image based on the position information held in the position information holding unit, and specifying the pattern from the retrieved elements.

In an eighth aspect of the invention, an image processing method comprises detecting positions of the elements from the image, holding information about the detected positions of the elements, retrieving elements on the image based on the held position information, and specifying the pattern from the retrieved elements.

In a ninth aspect of the invention, a computer readable recording medium storing a program being capable of executing the following functions: a position detecting function for detecting positions of the elements from the image; a position information holding function for holding information about the positions of the elements which are detected by the position detecting function; and a pattern specifying function for retrieving elements on the image based on the position information held in the position information holding function, and specifying the pattern from the retrieved elements.

BRIEF DESCRIPTION OF THE DRAWINGS

The above object as well as other objects, features and advantages of the invention will become more apparent to those skilled in the art from the following description with reference to the accompanying drawings.

FIG. 16 is a flowchart showing an image recognition process in an image processing apparatus according to a second embodiment.

FIG. 17 is a flowchart showing a process of recording the position of an element according to the second embodiment.

DETAILED DESCRIPTION OF THE PREFERRED EMBODIMENTS

An image processing apparatus according to preferred embodiments of the present invention will be described in detail with reference to the accompanying drawings.

First Embodiment
(Structure of Image Processing Apparatus)

Figure 1:
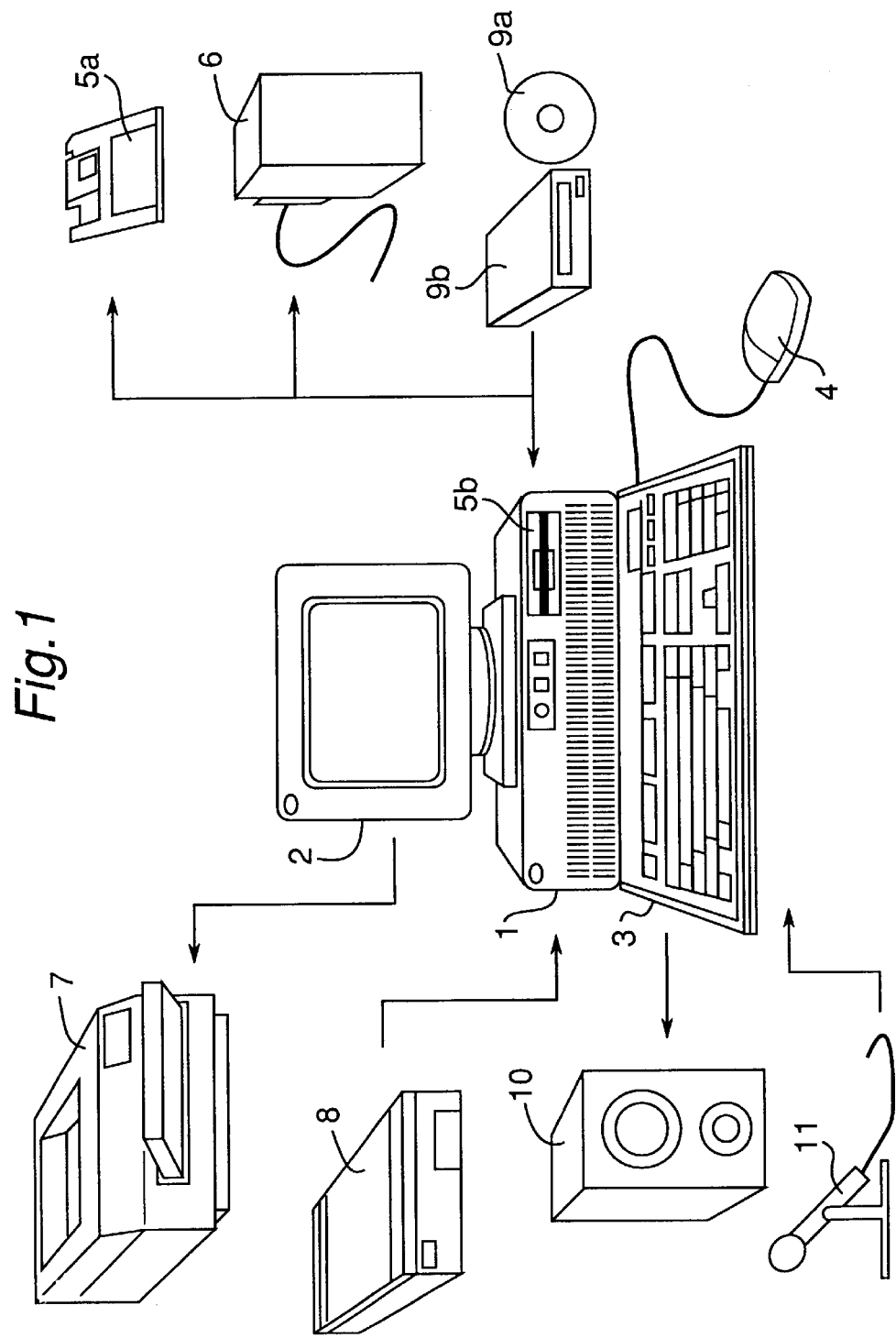
FIG. 1 is a diagram schematically showing the structure of an image processing apparatus according to the present invention.

FIG. 1 is a diagram showing the schematic structure of an image processing apparatus according to the present embodiment (which will be hereinafter referred to as a "system"). As shown in FIG. 1, the system comprises a central processing unit (which will be hereinafter referred to as a "CPU"), and is mainly constituted by a controller 1 for controlling the whole system. For example, Pentium manufactured by Intel Co., Ltd. or the like is used for the CPU. To the controller 1 are connected a display 2 for performing the display of images, characters or the like, the display for operations and the like, a keyboard 3 and a mouse 4 for carrying out various inputs, indicating operations and the like, a floppy disk drive 5a and a hard disk drive 6 which are data saving media, a printer 7 for printing characters, image data and the like, a scanner 8 for fetching image data, a CD-ROM drive 9b for reading data stored in a CD-ROM 9a, a speaker 10 for outputting a voice, and a microphone 11 for inputting a voice.

Figure 2:
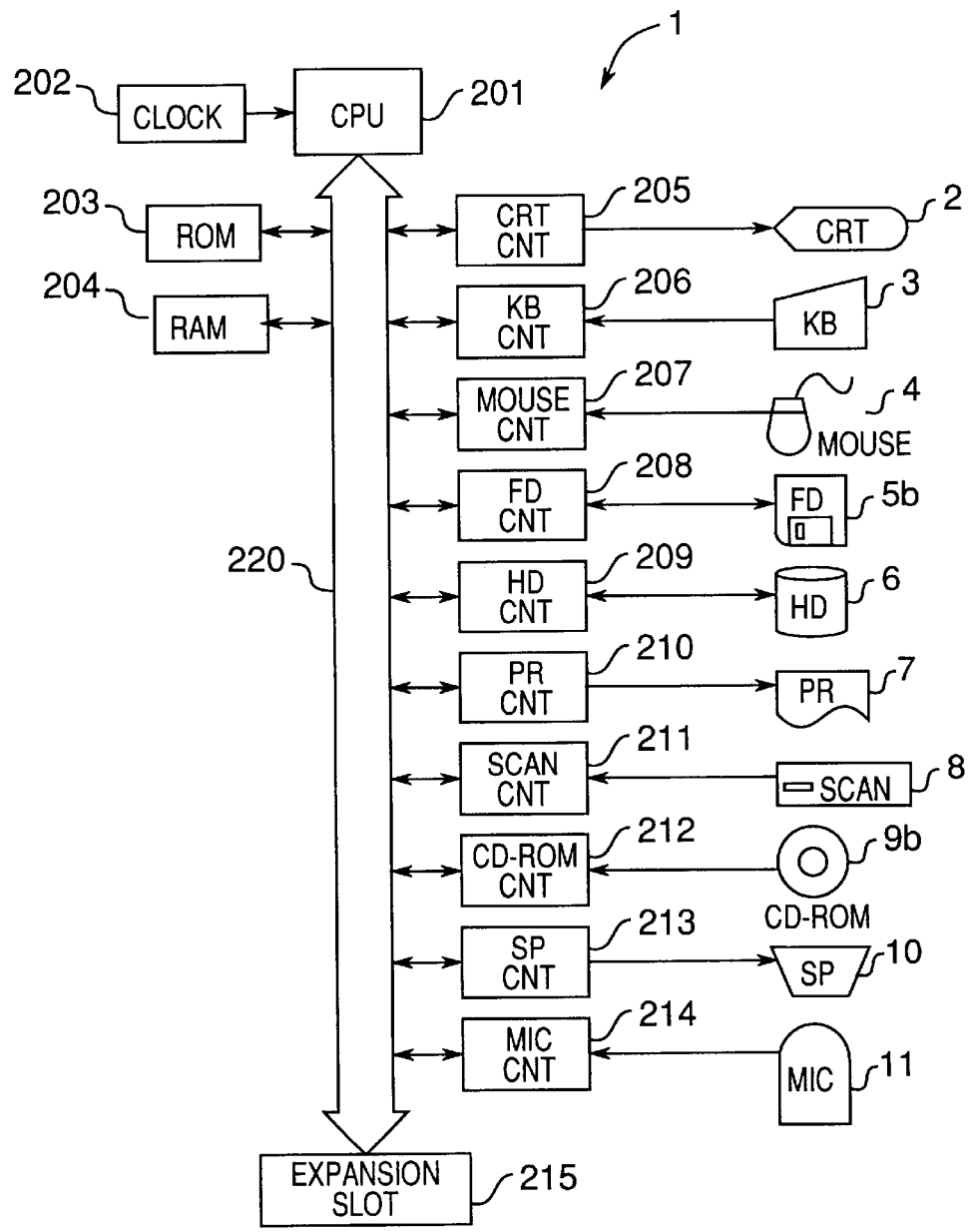
FIG. 2 is a block diagram of the image processing apparatus, mainly showing a controller.

FIG. 2 is a block diagram showing the present system. A ROM 203 in which a program for controlling the system is stored and a RAM 204 for temporarily storing a program and data to be executed for control by the CPU 201 are connected to the CPU 201 through a data bus 220. Moreover, a circuit to be connected to the CPU 201 through the data bus 220 includes a display control circuit 205 for controlling the display 2 for displaying images, characters or the like, a keyboard control circuit 206 for transferring and controlling an input from the keyboard 3, a mouse control circuit 207 for transferring and controlling an input from the mouse 4, a floppy disk drive control circuit 208 for controlling the floppy disk drive 5b, a hard disk drive control circuit 209 for controlling the hard disk drive 6, a printer control circuit 210 for controlling an output to the printer 7, a scanner control circuit 211 for controlling the scanner 8, a CD-ROM drive control circuit 212 for controlling the CD-ROM drive 9b, a speaker control circuit 213 for controlling the speaker 10, and a microphone control circuit 214 for controlling the microphone 11. Furthermore, a clock 202 for generating a reference clock necessary for operating the system is connected to the CPU 201, and an expansion slot 215 for connecting various extension boards is connected to the CPU 201 through the data bus 220. A SCSII board is connected to the expansion slot 215, and the floppy disk unit 5b, the hard disk drive 6, the scanner 8, the CD-ROM drive 9b or the like may be connected through the SCSII board.

While the floppy disk drive 5a and the hard disk drive 6 have been used as the data storage media in the above-mentioned system, other information recording media such as a magneto-optic disk (MO) and the like may be used. Moreover, while the scanner 8 is used as the image data input device, other data input devices such as a steel video camera, a digital camera and the like may be used. Furthermore, while the printer 7 has been used as an output device, other output devices such as a digital printer may be used. In the present system, moreover, a program for implementing a data management system is stored in the ROM 203. However, a part of or all the programs may be stored in the information recording media such as the floppy disk drive 5a, the hard disk drive 6, the CD-ROM drive 9b and the like, and a program and data may be read out from the information recording media to the RAM 204 if necessary and may be executed.

(Main Routine)

Figure 3:
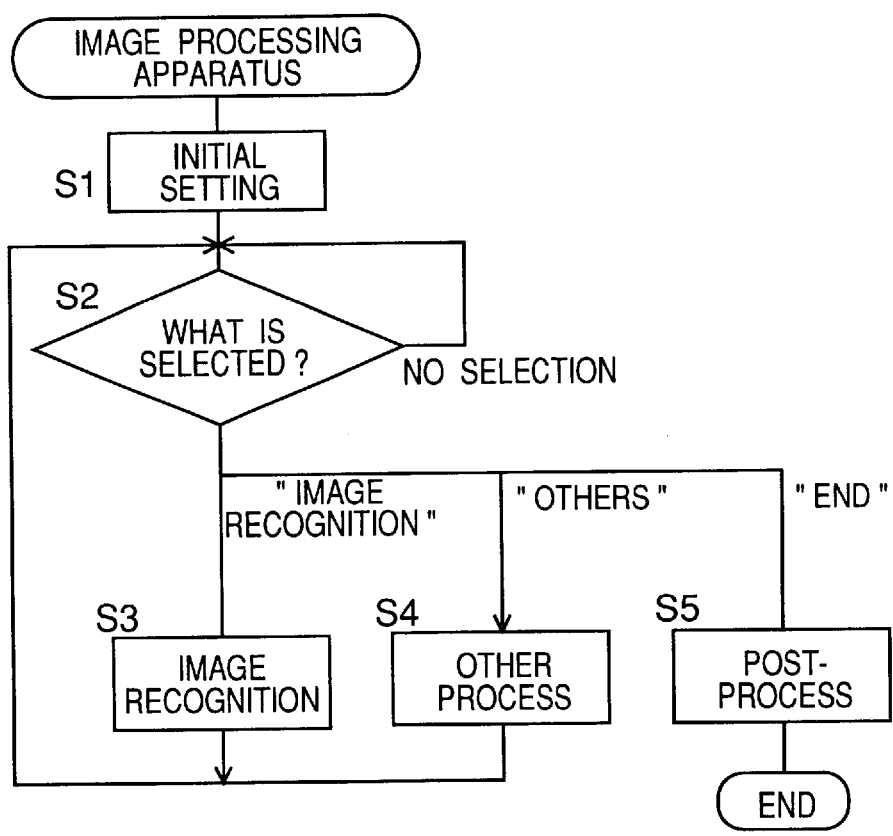
FIG. 3 is a flowchart showing a main routine in ;the image processing apparatus.

FIG. 3 is a flowchart showing a main routine of a program to be executed by the CPU 201 in the system. The system (CPU 201) sequentially executes each process according to user's operation.

When the program is started, first of all, an initializing process for initializing a flag or the like necessary for each of the subsequent process and for displaying an initial menu screen and the like is carried out (Si). Icons for selecting a process such as "IMAGE RECOGNITION" "OTHERS" and the likes are displayed on an initial menu screen. When the user selects one of the icons, a process corresponding to the icon is executed. Next, it is decided whether or not any process is selected by the user on the initial menu screen (S2). If the "IMAGE RECOGNITION" is selected at the step S2, the routine proceeds to an image recognizing process (S3) for performing a process of confirming the presence of a pattern having a specific layout (referred to as "layout pattern") in an input image. Then, the routine returns to the step S2. At the step S2, "OTHERS" is selected, another process (S4) which is a predetermined process other than the image recognition is carried out. Then, the routine returns to the step S2. At the step S2, "END" is selected, a predetermined post-process (S5) for terminating the operation of the system is carried out to end the control. If nothing is selected at the step S2, the user's selection of any of the process is waited.

Since another process (step S4) and a post-process (step S5) are basically the same as well-known process to be used in a general information processing system, their description will be omitted. The image recognition process (step S3) will be described later in detail.

(Search Region of Specific Pattern)

The image processing apparatus according to the present embodiment serves to retrieve a specific pattern for each predetermined search region of an image when the specific pattern is to be retrieved from the image. More specifically, a partial region of the image is set to the search region. The search region is shifted in a predetermined scanning direction in the image, and the specific pattern is retrieved in the search region at the shifted position. The size and shift amount of the search region will be described.

Figure 4A:
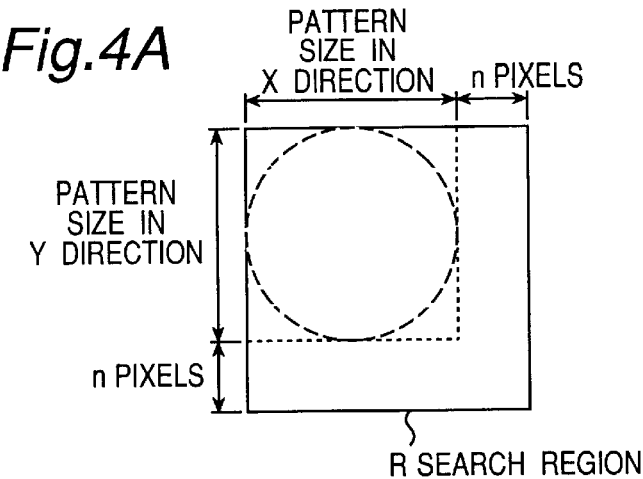
FIG. 4A is a diagram illustrating the size of a search region.

The size of the search region is determined in the following manner. More specifically, as shown in FIG. 4A, the size of a search region R is set greater than the size of a specific pattern to be retrieved by respective predetermined amounts (hereinafter referred to as "size increase amounts") in the x direction (the horizontal scanning direction or the right direction in the drawing) and the y direction (the vertical direction or the downward direction in the drawing). These increase amounts are set to two pixels or more. For convenience of description here the size increase amounts in the x and y directions are set identical to each other (n pixels, (n≧2)).

Figure 4B:
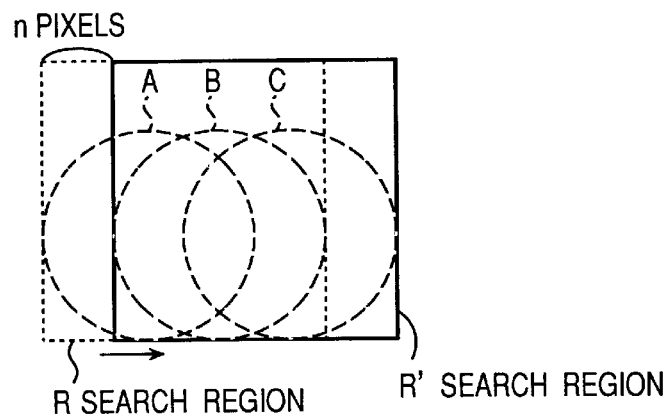
FIG. 4B is a diagram illustrating a shift in the x direction (horizontal scanning direction) of the search region.
Figure 4C:
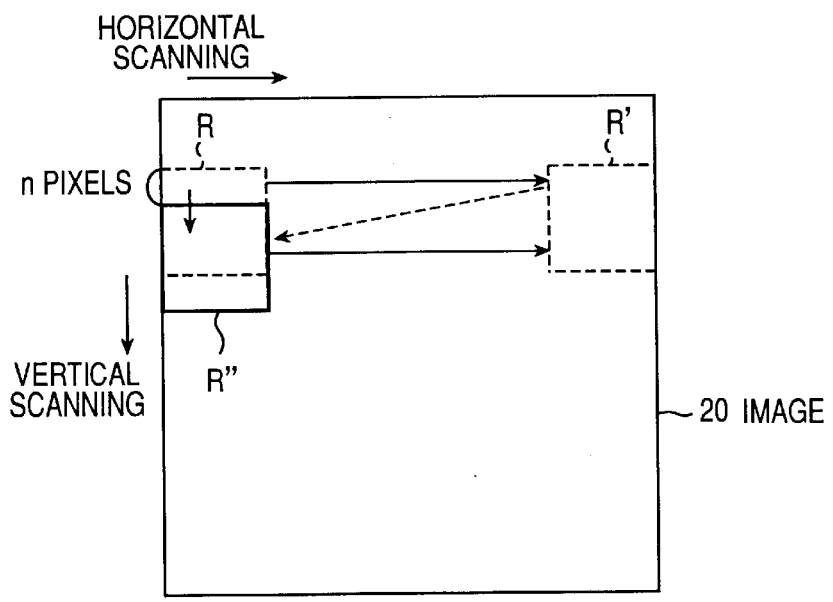
FIG. 4C is a diagram illustrating a shift in the y direction (vertical scanning direction) of the search region.

Moreover, the shift amount in the x direction of the search region R is set equal to the size increase amount in the x direction. As shown in FIG. 4B, after the image processing apparatus finishes the retrieval of one search region R, then it retrieves a new search region R' obtained by shifting the search region R by n pixels in the x direction. Thus, the search region is shifted by the size increase amount. Consequently, if a layout pattern (shown as broken line circles A, B and C) to be found in a region obtained by combining the search region R and a next search region R' as shown in FIG. 4B, it can be necessarily detected in either of the both search regions. Similarly, the shift amount is set equal to the size increase amount in the y direction. As shown in FIG. 4C, if the search region R is shifted in the x direction and reaches the right end of the image 20 (the search region R'), then the region is returned to the left end of the image 20 and is shifted by a predetermined amount in the y direction (the search region R").

As described above, when detecting a layout pattern, the image processing apparatus sets a search region having a larger size than the size of the layout pattern by a predetermined amount (n pixels (n≧2) and detects a specific pattern while shifting the search region every predetermined amount in the image. Thus, the limited region or a part of the image instead of the whole image is set to the search region, and a specific pattern is retrieved for each search region. Consequently, a working region on a memory required for the retrieval can be reduced more than in the case of retrieval through the whole image. Moreover, a time required for the process can be shortened. Furthermore, by shifting the search region by a predetermined amount n to retrieve the specific pattern, a time required for scanning can be reduced as compared with the case in which the shift is conventionally carried out every pixel, and a time required for retrieving the specific pattern can be shortened. It is preferable that an optimal value should be obtained for the predetermined amount n by an experiment. In the experiment, it was confirmed that a process is carried out with n=2 at a speed which is about three times as high as the speed for n=1, and with n=3 at a speed which is about seven times as high as the speed with n=1.

(Method for Detecting Element and Specific (Layout) Pattern)

Figure 5:
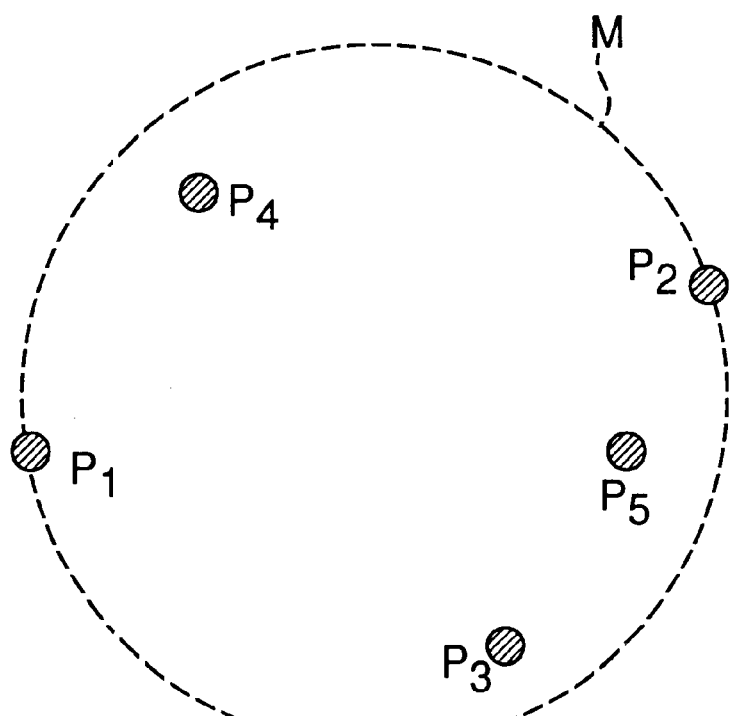
FIG. 5 is a diagram showing an example of a layout pattern detected by the image processing apparatus.

Description will be given to a specific pattern detected by the image processing apparatus. FIG. 5 shows an example of the specific pattern which is an object to be retrieved. As shown in FIG. 5, a specific pattern M comprises a plurality of elements (element images) P1 to P5. These elements P1 to P5 are arranged with a constant relative positional relationship. The elements P1 to P5 are predetermined images comprising at least one pixel, and components of the specific pattern. The system decides these elements P1 to P5 and the relative positional relationship among the elements P1 to P5, thereby recognizing the specific pattern M. Thus the "layout pattern" is specified by the constant layout of such elements.

Figure 6A:
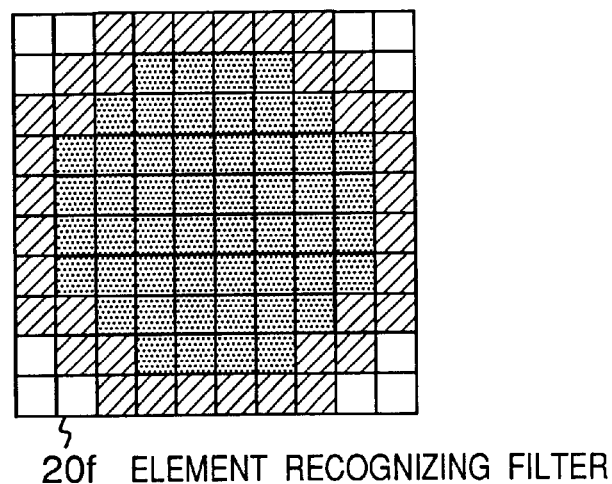
FIG. 6A is a diagram illustrating an element recognizing filter.

Each of the elements constituting the layout pattern is recognized by using an element recognizing filter shown in FIG. 6A. The filter implies a region having a predetermined size for examining whether or not an image in the region has a predetermined feature. The recognition is carried out in the following manner. More specifically, the element recognizing filter 20*f* is superposed over a partial region of the image 20, and the feature amount of a pixel of an image is extracted in respective regions of the central portion of the element recognizing filter 20*f* (which is hatched with a dot) and a peripheral portion thereof (which is hatched in a slant line). Pixel of which feature amount is within a predetermined range is labeled. When each number of the labeled pixels in the central portion and the peripheral portion of the filter 20*f* is within a predetermined range, respectively, it is deemed that an element exists in the position of the central portion of the filter 20*f*. For example, if the number of the labeled pixels in the central portion of the filter 20*f* is 45 or more and the number of the labeled pixels in the peripheral portion is one or less, it is deemed that an element is present. It is assumed that the element is detected in the central portion of the element recognizing filter 20*f*. The feature amount to be extracted includes the number of pixels which are within a specific range of a color space, the strength of an edge, a co-occurrence characteristic obtained by conversion of the image into a binary image. Herein, the element has a circular pattern.

Figure 6B:
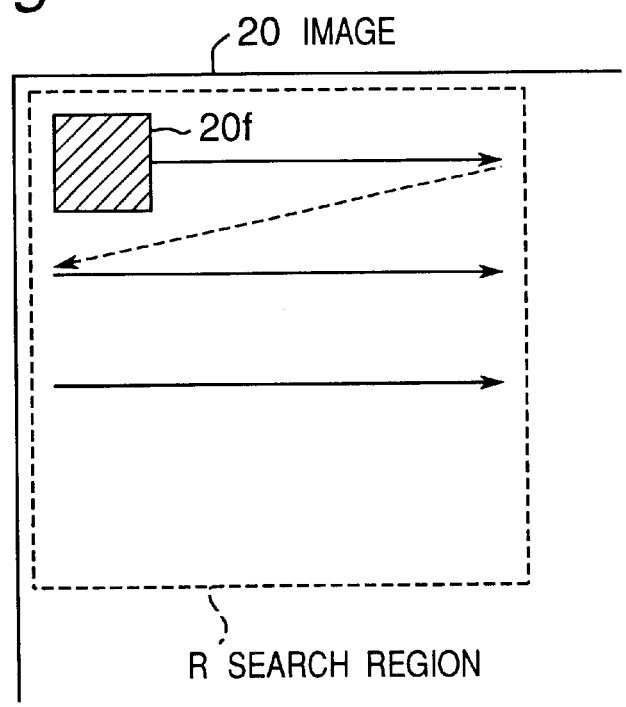
FIG. 6B is a diagram illustrating a scan in the search region using the element recognizing filter.

As described above, the image processing apparatus retrieves a layout pattern for each search region R. The image processing apparatus scans the search region R with the element recognizing filter 20*f* as shown in FIG. 6B, and detects an element to confirm the presence of the layout pattern.

Next, a method for recognizing a layout pattern from the detected element will be described. The image is processing apparatus scans the inside of the search region R by means of the element recognizing filter 20*f*. When the image processing apparatus detects elements, it confirms the relative positional relationship of the detected elements and decides whether or not they are arranged with a particular positional relationship, thereby recognizing a layout pattern. More specifically, two elements having the greatest distance therebetween are first specified from a plurality of elements detected in the search region R. Next, the positional relationship between these tow elements is obtained. When the positional relationship between these two elements is obtained, the positions of other elements are necessarily determined. Accordingly, the positions in which other elements are to be present are obtained from the positional relationship between the two elements, and it is confirmed whether or not the elements are present in the positions thus obtained. When all the elements are detected or found in the positions thus obtained, a layout pattern is recognized to be present in the search region R.

Figure 7A:
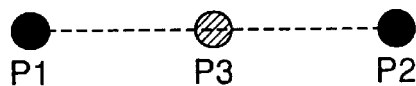
FIGS. 7A to 7D are diagrams illustrating the magnitude of an error (difference) made when other elements are to be detected by using two elements.
Figure 7B:
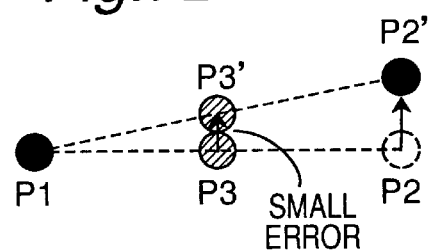
Figure 7C:
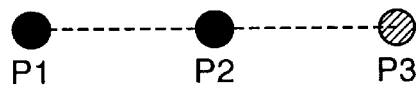
Figure 7D:
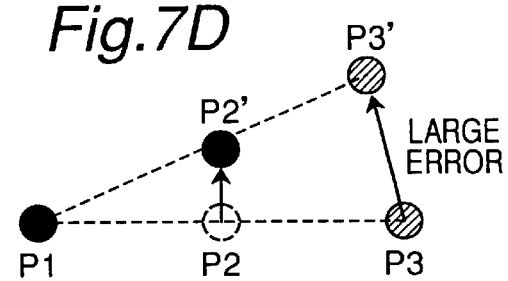

While the two elements having the greatest distance therebetween are first obtained as described above, it is also possible to first obtain two elements having a distance therebetween with a predetermined value. The reason why two elements having the greatest distance therebetween are first obtained is to reduce an error made when obtaining the positions of other elements. For example, in the case in which the elements P1 and P2 having the greatest distance therebetween are first obtained as shown in FIGS. 7A and 7B, an error (a difference between elements P3 and P'3) made by obtaining other elements becomes smaller than an original error when an error (a difference between the elements P2 and P'2) is made on the first element detection. On the other hand, as shown in FIGS. 7C and 7D, in the case in which the elements P1 and P2 having the greatest distance therebetween are not first obtained, the error (the difference between the elements P3 and P'3) made by obtaining other elements becomes greater than the original error when the error (the difference between the elements P2 and P'2) is made on the first element detection. By first obtaining the elements having the greatest distance therebetween, thus, the error made by obtaining the residual elements can be reduced.

(Image Recognition Process)

An image recognition process (step S3) will be described below with reference to flowcharts shown in FIGS. 8 to 13.

Figure 8:
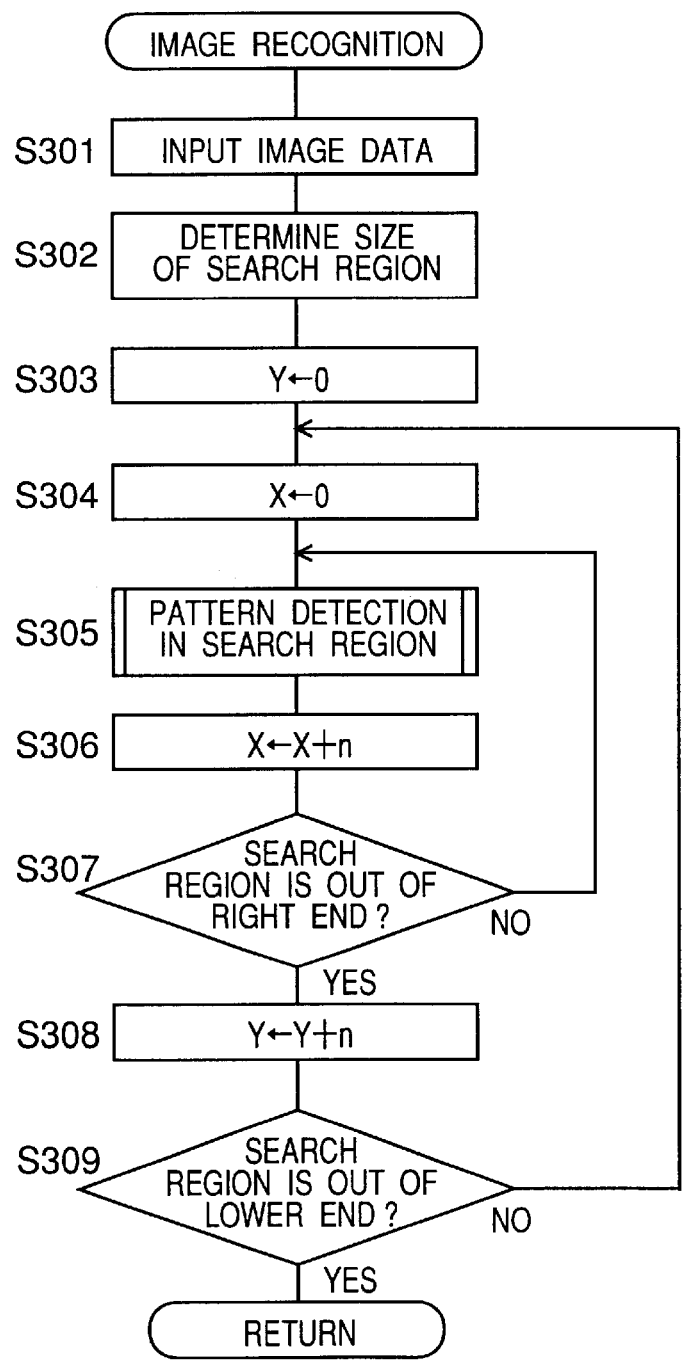
FIG. 8 is a flowchart showing an image recognition process in the image processing apparatus according to a first embodiment.

As shown in FIG. 8, first of all, image data of the image 20 which is the retrieval object of a layout pattern are input (S301). More specifically, the image data of the image 20 specified by a user are loaded into the RAM 204. Then, the size of the search region R is set (S302). As described above, the size of the search region R is set by adding a size increase amount to the sizes of the layout pattern in the x and y directions, respectively.

Next, a coordinate Y is set to 0 in order to set the position in the y direction of the search region R to the upper end of the image (S303). A coordinate X is set to 0 in order to set the position in the x direction of the search region R to the left end of the image 20 (S304). The coordinate values X and Y indicates the upper left end of the search region R, and the rectangular search region R is set with a size determined based on this position. Then, an element is detected by using the element recognizing filter 20*f* in the search region R, thereby detecting a layout pattern (S305). Details of this process will be described later. Thereafter, a shift amount n in the x direction is added to the coordinate value X in order to shift the search region R by a predetermined amount in the x direction (S306). It is decided whether or not the search region R gets out of the right end of the image 20 (S307). If the search region R does not get out of the right end of the image 20, the routine returns to a step S305 where the process of detecting a layout pattern is carried out in a new search region which is obtained by shifting the current region R by n pixels in the x direction. When the search region R gets out of the right end of the image 20, a shift amount n in the y direction is added to the coordinate value Y in order to shift the search region R by a predetermined amount in the y direction (S308). Then, it is decided whether or not the search region R gets out of the lower end of the image 20 (S309). If the search region R does not get out of the lower end o the image 20, the routine returns to the S304 where the process of detecting a layout pattern is carried out in a new search region shifted by n lines in the y direction on the left end of the image 20. The above-mentioned process (S304 to S309) are repeated while shifting the search region R on the image 20 as described above until the layout pattern detection for all the regions of the image 20 is ended.

Figure 9:
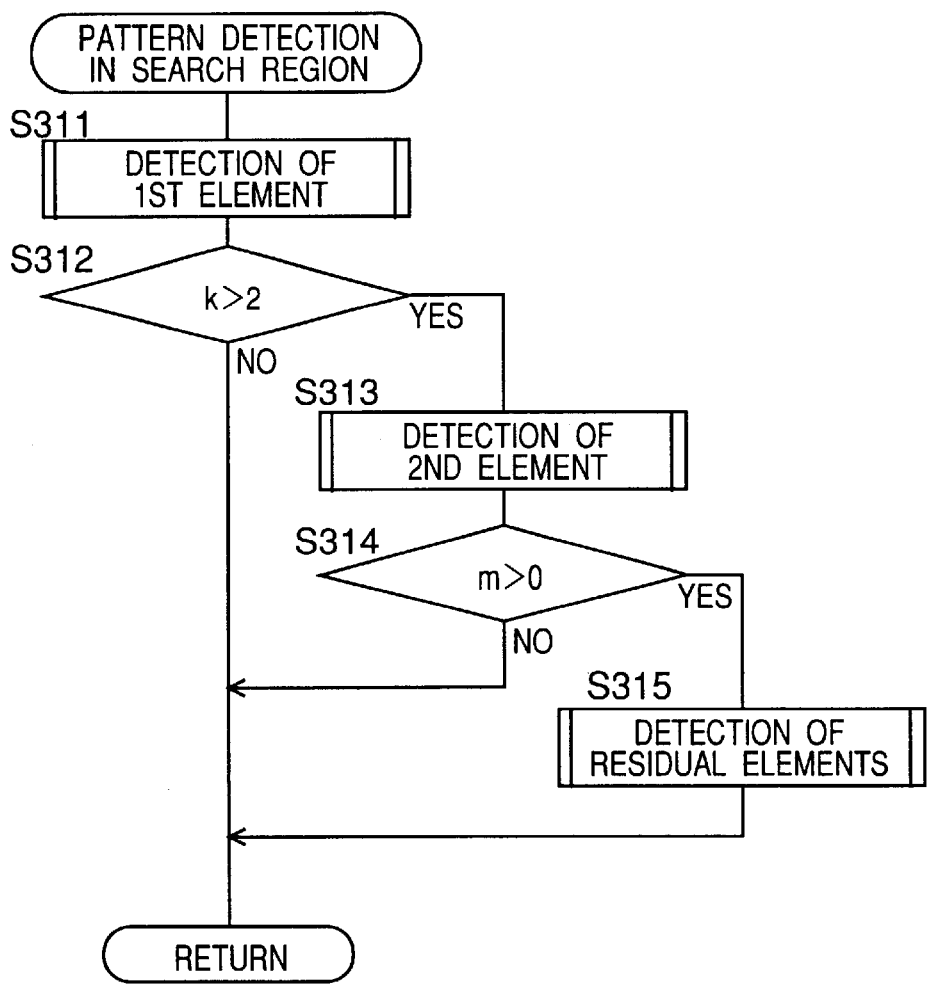
FIG. 9 is a flowchart showing a process of detecting a layout pattern in the search region according to the first embodiment.

FIG. 9 is a flowchart showing the process (step S305) of detecting a pattern in the search region. In the present process, first of all, a process of detecting a first element is carried out (S311). In the process of detecting a first element, all elements included in the search region R is detected as a first element candidate. The number of the first element candidates thus detected is set to k. Next, it is decided whether or not the number of the elements detected in the process of detecting a first element is three or more (S312). If the number is less than three, the routine returns. If the number of the detected elements is three or more, a process of detecting a second element is carried out (S313). In the process of detecting a second element, elements present at a predetermined distance (the maximum value of a distance between the elements) from the element of the first element candidate are treated as a second element candidate. The number of the second element candidates detected herein is set to m. It is decided whether or not the second element candidate is detected (S314). When the second element candidate is detected (m>0), a process of detecting residual elements is carried out (S315). When the second element candidate is not detected (that is, m=0), the routine returns. The first element candidate and the second element candidate are candidate for two elements which are first detected to detect a layout pattern. The process of detecting residual elements obtains the positions of the residual element candidates constituting the layout pattern together with the elements selected from the first and second element candidates, detects a layout pattern based on the obtained positions and so on. Description will be sequentially given to the process of detecting a first element (S311), the process of detecting a second element (S313) and the process of detecting residual elements (S315).

Figure 10:
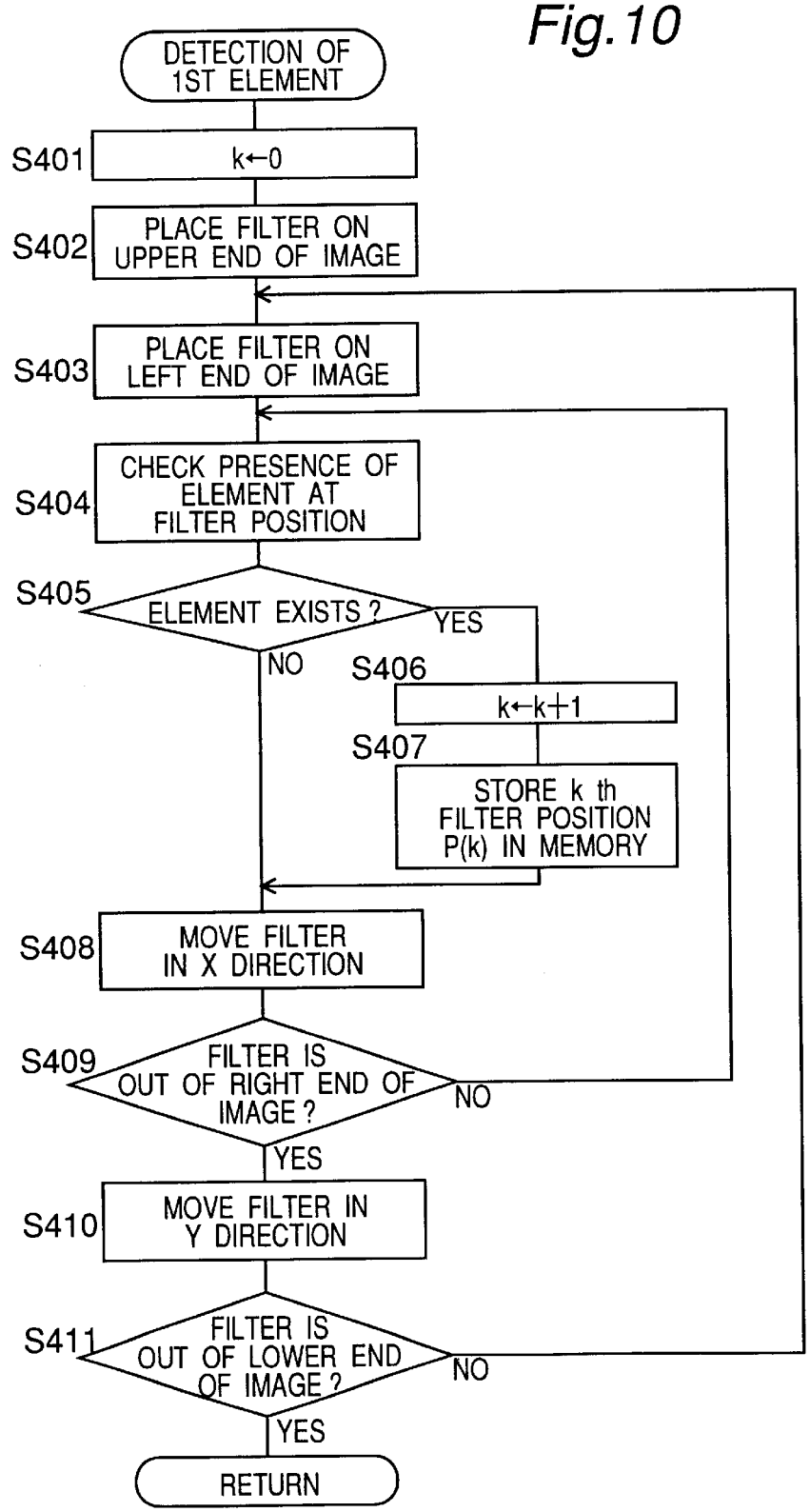
FIG. 10 is a flowchart showing a process of detecting a first element according to the first embodiment.

FIG. 10 is a flowchart showing the process of detecting a first element (step S311). In the present process, all the elements included in the search region R are detected and set to the first element candidates.

First of all, therefore, a variable k indicative of the number of the first element candidates is initialized to 0 (S401). The y coordinate of the element recognizing filter 20f is determined such that the element recognizing filter 20f is positioned at the upper end in the search region R (S402). Moreover, the x coordinate of the element recognizing filter 20f is determined such that the element recognizing filter 20f is positioned at the left end in the search region R (S403). The position of the upper left end of the element recognizing filter 20f corresponds to the coordinates (x, y). It is examined, by the element recognizing filter 20f, whether or not there is an element in the determined position (S404), and a result of the examination is decided (S405). When the element is detected based on the examination result, the variable k is incremented (S406) and the position of the detected element is stored as kth element position information P(k) in the predetermined region of the RAM 204 (S407). When no element is detected, the steps S406 and S407 are skipped.

Next, the element recognizing filter 20f is shifted by a predetermined amount in the x direction (S408). Then, it is decided whether or not the element recognizing filter 20f gets out of the right end of the search region R (S409). When the element recognizing filter 20f does not get out of the right end of the search region R, the routine returns to the step S404 where an element is detected in a new position shifted in the x direction in the search region R. When the element recognizing filter 20f gets out of the right end of the search region R, the element recognizing filter 20f is shifted by a predetermined amount in the y direction (S410), and it is decided whether or not the element recognizing filter 20f gets out of the lower end of the search region R (S411). When the element recognizing filter 20f does not get out of the lower end of the search region R, the routine returns to the step S403 where the process of detecting an element is carried out in a new position shifted by a predetermined amount in the y direction on the left end of the search region R. When the element recognizing filter 20f gets out of the lower end of the search region R, the routine returns. Thus, the element recognizing filter 20f is shifted in the search region R and the above-mentioned process (S403 to S411) are repeated until the element detection for the whole search region R is ended.

Figure 11:
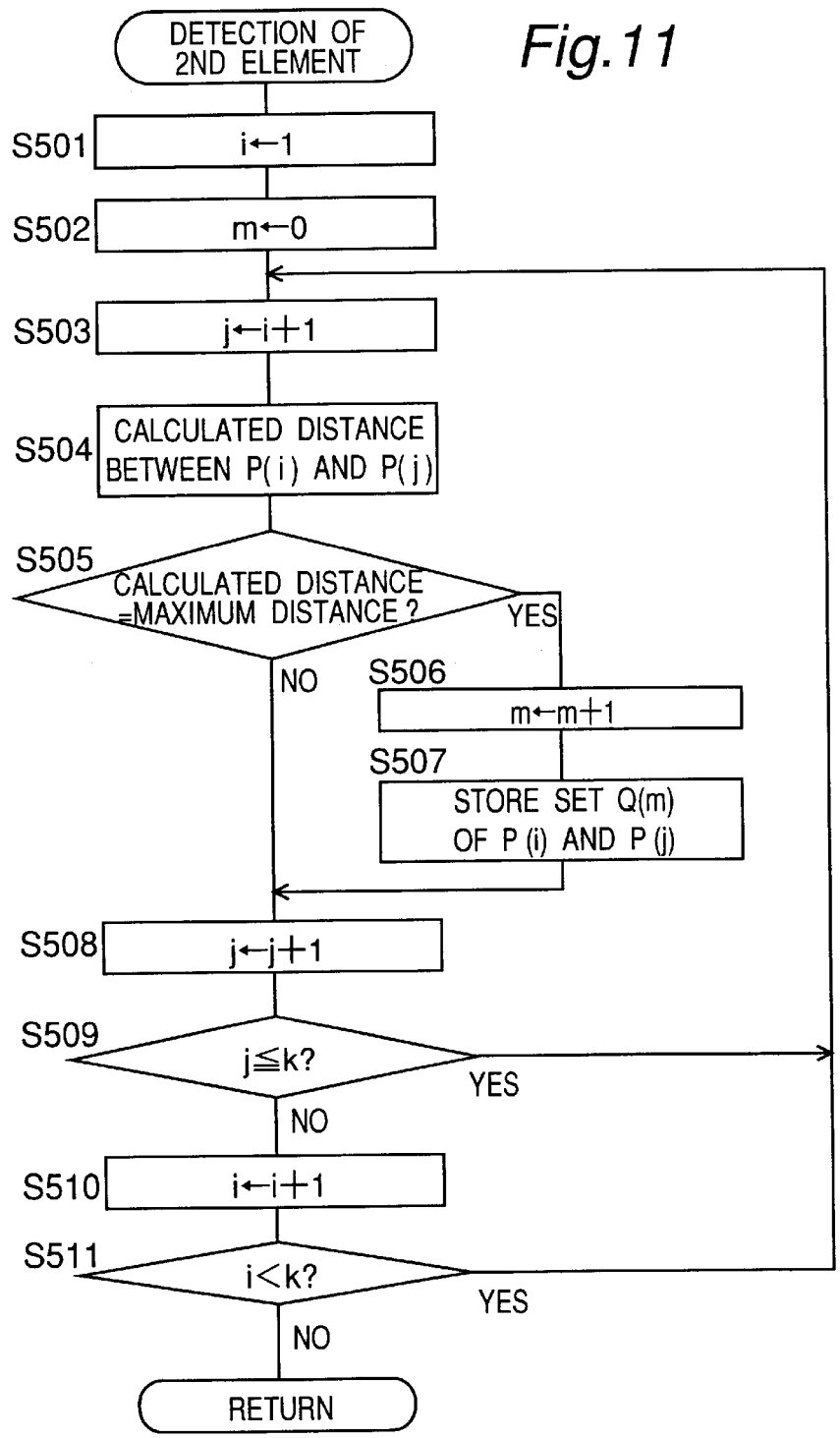
FIG. 11 is a flowchart showing a process of detecting a second element.

FIG. 11 is a flowchart showing a process of detecting a second element (step S313). In the present process, elements, by a predetermined value, apart from each first element candidate detected by the process of detecting a first element are obtained as second element candidates. The set of the elements is obtained as a set Q(m) of the first and second element candidates. The predetermined value is set to the value of the maximum distance (which will be hereinafter referred to as a "maximum distance") between the elements constituting a layout pattern to be detected.

Concretely, first of all, a variable i for specifying the first element candidate is initialized to 1 (S501), and a variable m for specifying the set of the first and second element candidates is initialized to 0 (S502).

Then, a variable j for specifying the second element candidate is set to (i−1) (S503). A distance between element positions P(i) and P(j) specified by the variable i and j is calculated (S504). It is decided whether or not the calculated distance is equal to the maximum distance (S505). According to the decision, when a difference between the distances to be compared is set within a predetermined error range, it is decided that the distances are equal to each other. When the calculated distance is equal to the maximum distance, it is decided that the elements placed in the element positions specified by the variables i and j are the first and second element candidates, respectively. At this time, the variable m is incremented (S506) and the set of the element positions P(i) and P(j) is stored as mth set Q(m) of the first and second element candidates in the predetermined region of the RAM 204 (S507). When the calculated distance is not equal to the maximum distance, these process (steps S506 and S507) are not performed.

Subsequently, the variables j and i are sequentially incremented. The distance between elements are examined for all the element candidates detected in the process of detecting a first element, and all the sets Q(m) of the first and second element candidates are obtained from these element candidates (S503 to S511).

Figure 12:
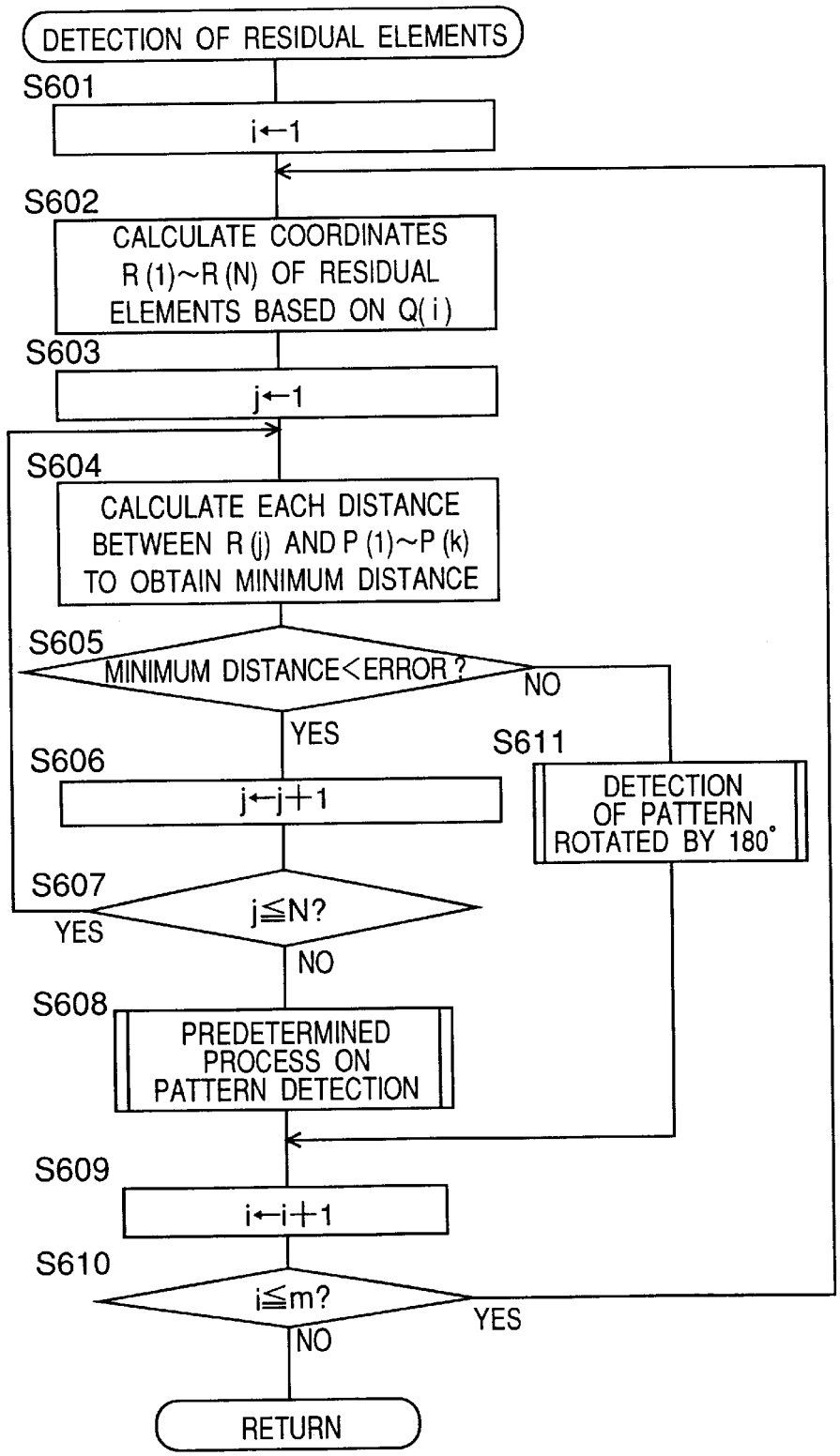
FIG. 12 is a flowchart showing a process of detecting residual elements.

FIG. 12 is a flowchart showing the process of detecting residual elements (step S315). In the present process, the positional relationship between the elements is obtained by using the set of the first and second element candidates detected in the process of detecting a second element, and the positions of the residual elements are specified based on the positional relationship. Thus, a layout pattern in the image is detected. During the layout pattern detection, a predetermined process is carried out. The image processing apparatus holds, as a reference pattern, the information about the position of each element of the layout pattern to be detected in a storage device such as the hard disk unit 6 or the like. The positions of the residual elements are specified with reference to the positional information about the position of the element.

Concretely, the variable i for designating the set of the first and second element candidates is first initialized to 1 in the present process (S601). Based on the positions of the first and second elements in a set Q (i) designated by the variable i, positions R(1) to R(N) where other elements are to be placed are calculated (S602) Here, the variable N indicates the number of residual elements obtained by excluding the first and second elements from all the elements constituting the layout pattern. When the positions of two of the elements constituting the layout pattern are specified, the relative positions of the residual elements for the two elements are obvious. Therefore, the positions of the residual elements can be calculated easily.

Figure 14A:
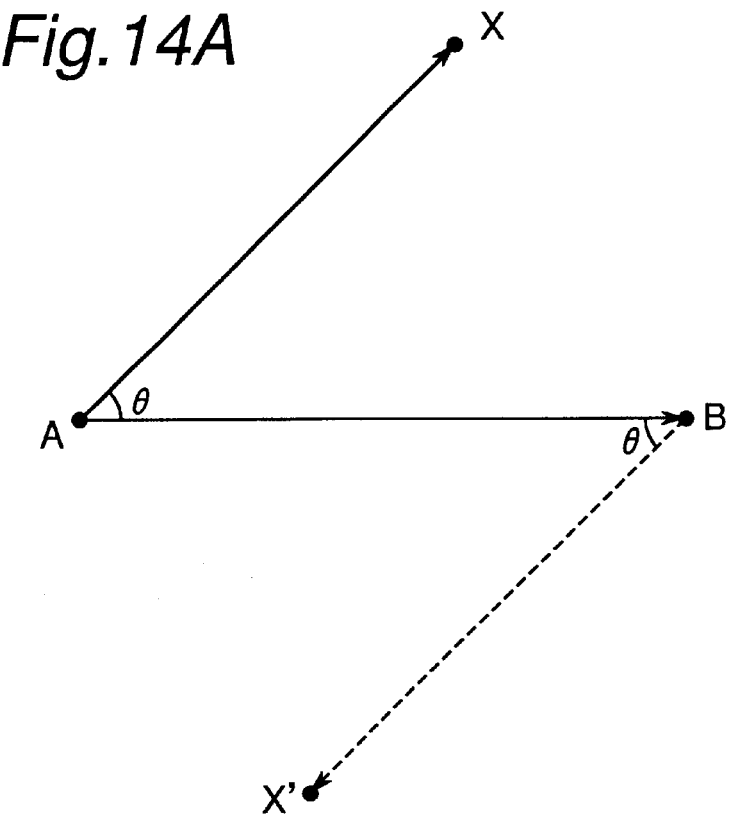
FIG. 14A is a diagram showing the positional relationship of a point X with points A and B.

For example, in the case in which three points of A(xa, ya), B(xb, yb) and X(x, y) are arranged as shown in FIG. 14A, the coordinates on the point X are expressed by the following equation using a vector v=(xa−xb, ya−yb) from the point A toward the point B based on the point A:

$$\begin{pmatrix} x \\ y \end{pmatrix} = A + \alpha \begin{pmatrix} \cos\theta & -\sin\theta \\ \sin\theta & \cos\theta \end{pmatrix} V \qquad (1)$$

wherein α=(length of line AX)/(length of line AB), and θ is an angle formed by the line AB and the line AX.

Thus, the coordinates of the third point (X) are obtained based on the coordinates of two reference points (A and B) if they are determined. In the case in which a certain layout pattern is to be detected, two elements giving the maximum distance which constitute the layout pattern, that is, the first and second elements are specified and the α and θ are preliminarily obtained for other elements based on the positions of the elements. Consequently, when the first and second elements are obtained, the positions of other elements can be calculated by the above equation.

In the present embodiment, accordingly, a set of elements giving the maximum distance between the elements in the layout pattern, that is, the first and second elements are first obtained, and a vector from one of the first and second elements toward the other element (which will be hereinafter referred to as a "reference vector") is obtained based on one of the elements, and the positions of the residual elements are obtained by using the vector. In this case, when the direction of the reference vector is reversed (a vector from the point B toward the point A is set to the reference vector in the above-mentioned example), a point X' is obtained by the above equation. A graphic formed by the points X', A and B are identical to a graphic obtained by rotating a graphic formed by the points X, A and B by 180 degrees. Consequently, by calculating the coordinate positions of the residual elements by using two reference vectors in the opposite directions, it is possible to detect a pattern obtained by rotating, by 180 degrees, a layout pattern which can be detected by using one of the reference vectors.

Figure 14B:
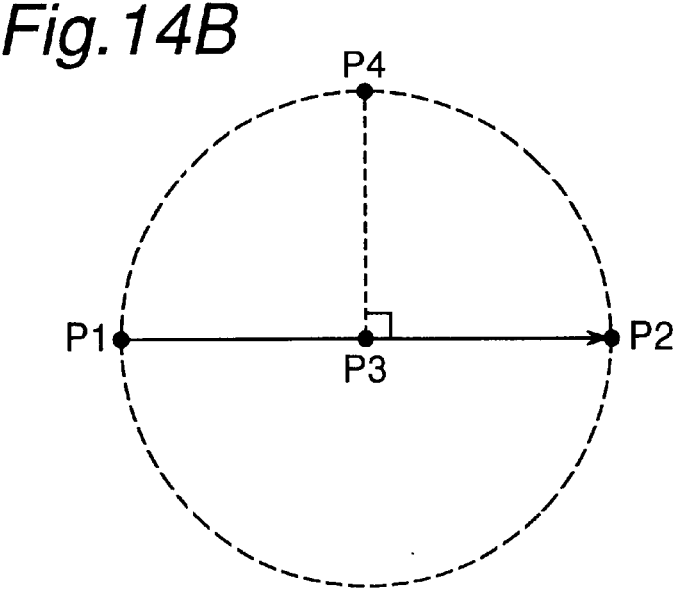
FIG. 14B is a diagram showing an example of a layout pattern comprising four elements.

The element position on a layout pattern M shown in FIG. 14B can be calculated in the following manner. In the layout pattern M, the elements P1, P2 and P4 are arranged on the same circumference, the elements P1, P2 and P3 are arranged on the same diameter, and the element P3 is placed in the middle point of the elements P1 and P2. Furthermore, the element P4 is provided such that a straight line connecting the elements P4 and P3 is orthogonal to a straight line connecting the elements P1 and P2. The elements P1 and P2 give the maximum distance. A vector from the element P1 toward the element P2 is set to the reference vector v=(x2−x1, y2−y1). The elements P3 and P4 can be expressed by using the reference vector v in the following manner.

$$P3 = P1 + \frac{1}{2}\begin{pmatrix} \cos(0°) & -\sin(0°) \\ \sin(0°) & \cos(0°) \end{pmatrix} V = \frac{1}{2}\begin{pmatrix} x1+x2 \\ y1+y2 \end{pmatrix} \qquad (2)$$

$$P4 = P1 + \frac{\sqrt{2}}{2}\begin{pmatrix} \cos(45°) & -\sin(45°) \\ \sin(45°) & \cos(45°) \end{pmatrix} V = \frac{1}{2}\begin{pmatrix} x1+x2+y1-y2 \\ -x1+x2+y1+y2 \end{pmatrix} \qquad (3)$$

As described above, when the coordinate values R(1) to R(N) where the residual elements are to be positioned are obtained, it is decided whether or not elements exist at these coordinate values R(1) to R(N). Thus, the presence of the element constituting the layout pattern is decided. More specifically, any of the coordinate values P(1) to P(k) of all the element candidates which is the closest to the reference values R(1) to R(N) of the coordinates. If their errors are in allowable range, it is decided that there is one of the elements constituting the layout pattern in that position.

In FIG. 12, consequently, the variable j for specifying the coordinate value R(j) of the residual elements thus calculated is set to 1 (S603). A distance between the coordinate value R(j) and each of the coordinate values P(1) to P(k) of all the element candidates is calculated and a minimum distance is obtained (S604). It is decided whether or not the minimum distance is within a predetermined error range (S605). When the minimum distance is within the error range, it is decided that these coordinates are coincident with each other and there is one of the residual elements constituting the layout pattern. Then, the variable j is incremented (S606). Similarly, it is decided whether or not there is an element in a position for the next coordinate value R(j) (S604 to S607). Subsequently, the existence of the residual elements is similarly checked. When the existence of the elements can be confirmed on all the coordinates of the residual elements, it is decided that the layout pattern can be detected. When the layout pattern can be detected, a predetermined process for the pattern detection is carried out (S608) and the routine proceeds to a step S609. In the predetermined process for the pattern detection, for example, the coordinate values where the layout pattern is detected are recorded in a file or a message that the layout pattern can be detected is displayed on a display unit.

Figure 13:
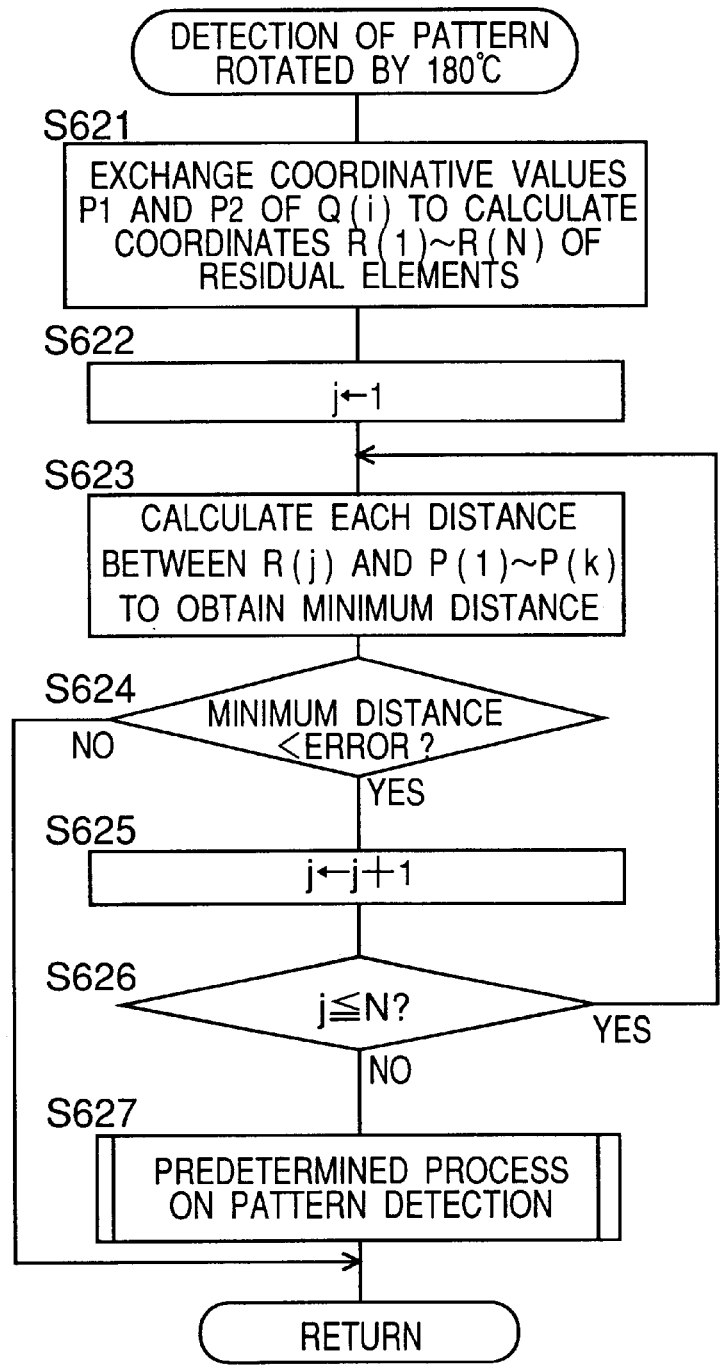
FIG. 13 is a flowchart showing a process of detecting a 180° rotation pattern.

If no existence of the element is confirmed on the coordinate value R(j) at all the steps S604 to S607, the routine escapes the loop (S604 to S607) and a process of detecting a pattern is carried out with the layout pattern rotated by 180 degrees (S611), FIG. 13 is a flowchart showing the process of detecting a pattern to be carried out with the layout pattern rotated by 180 degrees. The present process detects a pattern obtained by rotating, by 180 degrees, the layout pattern which can be detected at the steps S604 to S607. In the present process, consequently, the coordinate values of the first and second elements are first exchanged to obtain the coordinate values R(1) to R(N) of the residual elements (S621). That is, a reference vector in a direction opposite to the direction in the steps S604 to S607 is obtained. The subsequent process (steps S622 to S627) are the same as the process in the steps S603 to S608. At the step S624, when the existence of the element cannot be confirmed on the coordinate value R(j) where the element is to be present, the routine immediately returns and proceeds to the step S609.

Returning to FIG. 12, the variable i is incremented at the step S609 and the layout pattern is similarly detected for all the sets Q(i) of the first and second elements. A predetermined process is carried out during the layout pattern detection.

As described above, when retrieving, from an image, a layout pattern which comprises a plurality of elements having a constant relative positional relationship therebetween and is capable of being specified based on the positional relationship, the image processing apparatus according to the present embodiment detects two elements giving a maximum distance therebetween, specifies positions where the other elements should be present based on the positional relationship between the two elements and recognizes that the layout pattern is present in the image when the other elements can be detected in the specified positions. Thus, it is sufficient that only position information is stored as a reference pattern to be referred to during the detection. Therefore, the layout pattern can be detected with a small amount of information. Moreover, when the two elements are determined, the positions of the residual elements can be calculated. Therefore, it is preferable that the residual elements should be retrieved in the vicinity of the calculating positions. Thus, since the search region can be restricted, a time required for the detecting process can be shortened. Furthermore, the first two elements are selected to have the maximum distance therebetween. Consequently, it is also possible to reduce an error made when calculating the positions of the residual elements. In addition, the layout pattern is detected based on the relative positional relationship between the elements. Therefore, the layout pattern can be detected irrespective of the direction of the layout pattern in the image.

Second Embodiment

Figure 15A:
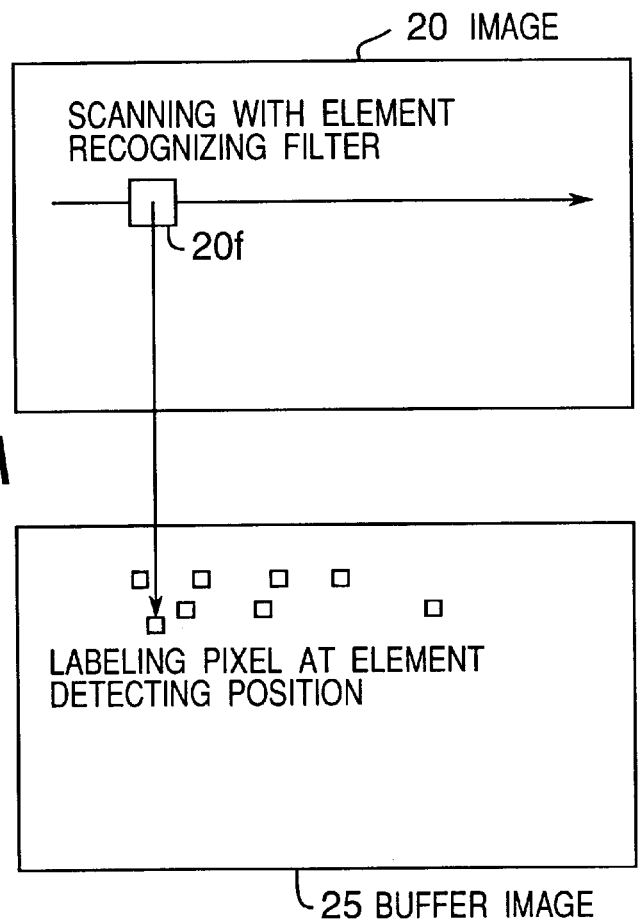
FIG. 15A is a diagram illustrating the record of element position information using a buffer image.

Another embodiment of an image processing apparatus will be described. An image processing apparatus according to the present embodiment wholly scans an image while shifting an element recognizing filter 20f by a predetermined shift amount in the x direction (the horizontal scanning direction) and the y direction (the vertical scanning direction) of the image 20, thereby detecting an element included in the image 20 for each region of the element recognizing filter 20f. The image processing apparatus records information about the detecting position of the detected element on a buffer image 25 corresponding to the original image 20 shown in FIG. 15A. The buffer image 25 is created with the same size (resolution) as the size of the original image 20 in the x and y directions such that each pixel of the buffer image 25 corresponds to each pixel of the original image 20 by one to one. Each pixel of the buffer image 25 is used as a flag indicating whether or not the element is detected in the region of the original image 20 corresponding to the pixel of the buffer image 25.

More specifically, the image processing apparatus scans the image 20 by means of the element recognizing filter 20f, detects an element, and labels the pixel of the buffer image 25 corresponding to a certain region of the image 20 where the element is detected (that is, turns ON the pixel as a flag). For example, a pixel on the position of the buffer image 25 corresponding to a position on the upper left end of the element recognizing filter 20f during the element detection over the original image 20 is labeled. Consequently, the position of the element can be specified by seeing the labeling status of each pixel of the buffer image 25.

Figure 15B:
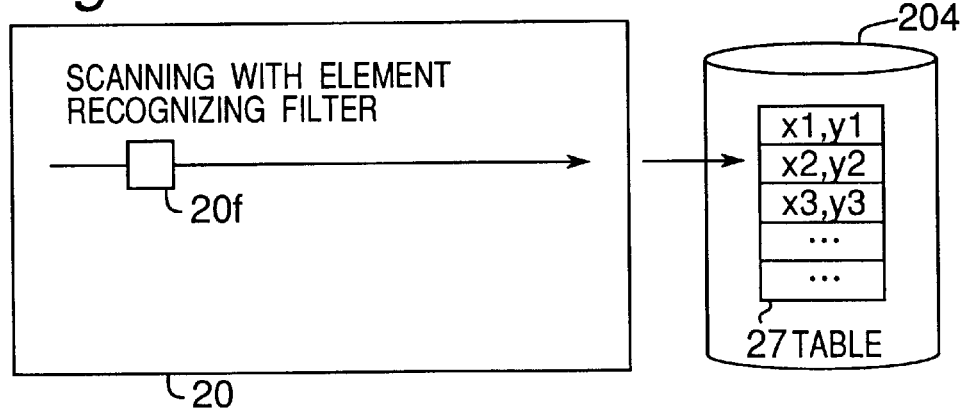
FIG. 15B is a diagram illustrating the record of the element position information using a table.

Other means for recording the element detecting position information can also be used in place of the buffer image 25. For example, as shown in FIG. 15B, a table 27 for storing the coordinates of a position on the image 20 where the element is detected can also be used. Alternatively, when the pixel value of each pixel of the image 20 is represented by a plurality of bits, one of the bits can be allocated as a flag (which will be hereinafter referred to as a "flag bit"). In this case, the flag bit is turned ON for a pixel in a predetermined position in the image region where the element is detected. In the subsequent process, the position of the element in the image can be recognized by referring to the flag bit for each pixel of the image.

Then, the image processing apparatus serves to specify the detected element position by referring to the buffer image 25 and to detect a layout pattern based on the detected element position.

As described above, the image processing apparatus according the present embodiment detects all the elements included in the image when detecting a layout pattern, and once records the result of the element detection in position information holding (storing) means such as a buffer image or the like. Then, the image processing apparatus serves to specify the position of the element by referring to the position holding means and to detect a layout pattern based on the position of the element. Thus, the image processing apparatus once records the result of the element detection in the position information holding means such as a buffer image or the like, and then refers to the result of the element detection. Consequently, the time required for a process related to the acquisition of the information about the position of the element can be shortened and a working region on a memory can be reduced.

Next, description will be given to the summary of the method for recognizing a layout pattern from the detected element. The image processing apparatus scans the image 20 by means of the element recognizing filter 20f, detects all the elements, decides the positional relationship between the detected elements, and recognizes the layout pattern based thereon. Concretely, first of all, two elements having the greatest distance therebetween are first specified from a plurality of detected elements. Next, the positional relationship between these two elements is obtained. When the positional relationship between these two elements is obtained, the positions of other elements are necessarily determined. Accordingly, the positions in which other elements are to be present are obtained from the positional relationship between the two elements, and it is confirmed whether or not the elements are present in the positions thus obtained. When all the elements can be confirmed in the positions thus obtained, it can be recognized that the image has a layout pattern. Description will be given to the image recognition process to be carried out as described above.

(Image Recognizing Process)

With reference to a flowchart shown in FIG. 16, description will be given to an image recognizing process according to the present embodiment (step S3). As shown in FIG. 16, when the present process is started, image data of the image 20 which is an object to retrieve a layout pattern are first input (S1301). More specifically, the image data of the image 20 specified by a user are loaded into a RAM 204. Next, an element position recording process for retrieving an element included in an image and recording the retrieval position of the element in the buffer image 25 is carried out (S1302). Then, the position of the element is specified by using the buffer image 25 and a layout pattern is detected based on the position of the element (S1303). Each process will be described below.

(Element Position Recording Process)

FIG. 17 is a flowchart showing an element position recording process (step S1302). First of all, the value of each pixel of the buffer image 25 is initialized (S1321). Next, the coordinate y is set to zero in order to set the position in the y direction of the element recognizing filter 20f onto the upper end of the image 20 (S1322), and furthermore, the coordinate x is set to zero in order to set the position in the x direction to the left end of the image 20 (S1323). The coordinate values x and y are set to the upper left end of the element recognizing filter 20f. Next, an element is detected by using the filter 20f in the position (x, y) (S1324). When the element is detected, that is, there is the element in that position, the pixel of the buffer image 25 corresponding to that position is labeled, thereby recording the element detecting position (S1326). Then, a predetermined value n is added to the coordinate value x in order to shift the element recognizing filter 20f by a predetermined amount in the x direction (S1327). It is decided whether or not the element recognizing filter 20f gets out of the right end of the image 20 (S1328). When the element recognizing filter 20f does not get out of the right end of the image 20, the routine returns to the S324 where the process of detecting an element in a new search region shifted by n pixels in the x direction is carried out. When the element recognizing filter 20f gets out of the right end of the image 20, a predetermined value n is added to the coordinate value y in order to shift the element recognizing filter 20f by a predetermined amount in the y direction (S1329). Then, it is decided whether or not the element recognizing filter 20f gets out of the lower end of the image 20 (S1330). When the element recognizing filter 20f does not get out of the lower end of the image 20, the routine returns to the step S1323 where the process of detecting an element is carried out in a new search region shifted by n lines in the y direction on the left end of the image 20. As described above, while the element recognizing filter 20f is being shifted on the image 20, the above-mentioned process (S1323 to S1330) are repeated until the element detection is ended over all the regions of the image 20. In the element detection, in addition to the detection using the filter as described above, a connecting region in which pixels having the same pixel value are continuously provided can be detected on an image obtained after the conversion of the image into a binary image, as an element. In this case, the connecting region may be detected as an element when the connecting region satisfies a predetermined condition, for example, the size of the region is within a predetermined range.

(Layout Pattern Detecting Process)

Next, the process of detecting a layout pattern (step S1303) will be described with reference to a flowchart shown in FIG. 18. In the present process, the position of the element is specified by using the buffer image 25, and a layout pattern is detected based on the position of the element. When the layout pattern is detected, a predetermined process is carried out.

Figure 18:
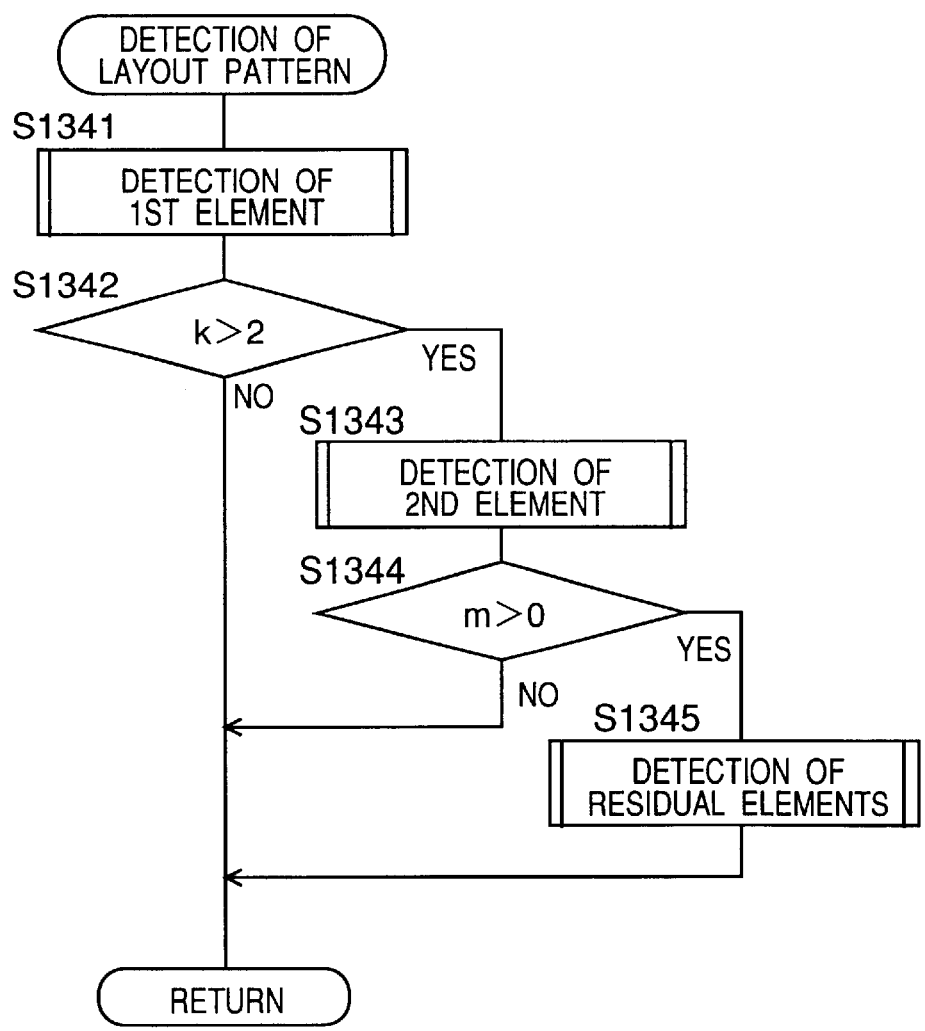
FIG. 18 is a flowchart showing a process of detecting a layout pattern according to the second embodiment.

Concretely, as shown in FIG. 18, a process of detecting a first element is carried out (S1341). In the process of detecting a first element, the positions of all elements included in the image 20 are specified by referring to the buffer image 25, and those elements are detected as a first element candidate. The number of the first element candidates thus detected is set to k. Next, it is decided whether or not the number of the elements detected in the process of detecting a first element is three or more (S1342). When the number is less than three, the routine returns. When the number of the detected elements is three or more, a process of detecting a second element is carried out (S1343). In the process of detecting a second element, an element provided at a predetermined distance (the maximum distance between the elements) from the first element candidate is set to a second element candidate. At this time, the number of the second element candidates detected at this time is set to m. It is decided whether or not the second element candidate is detected (S1344). When the second element candidate is detected (m>0), a process of detecting residual elements is carried out (S1345). When the second element candidate is not detected (m=0), the routine returns. The first element candidate and the second element candidate are first detected for detecting a layout pattern. In the process of detecting residual elements, obtained is the positions of the residual element candidates constituting the layout pattern together with the element selected from the first and second element candidates. Based on the positions, the process of detecting a layout pattern or the like is carried out.

Figure 19:
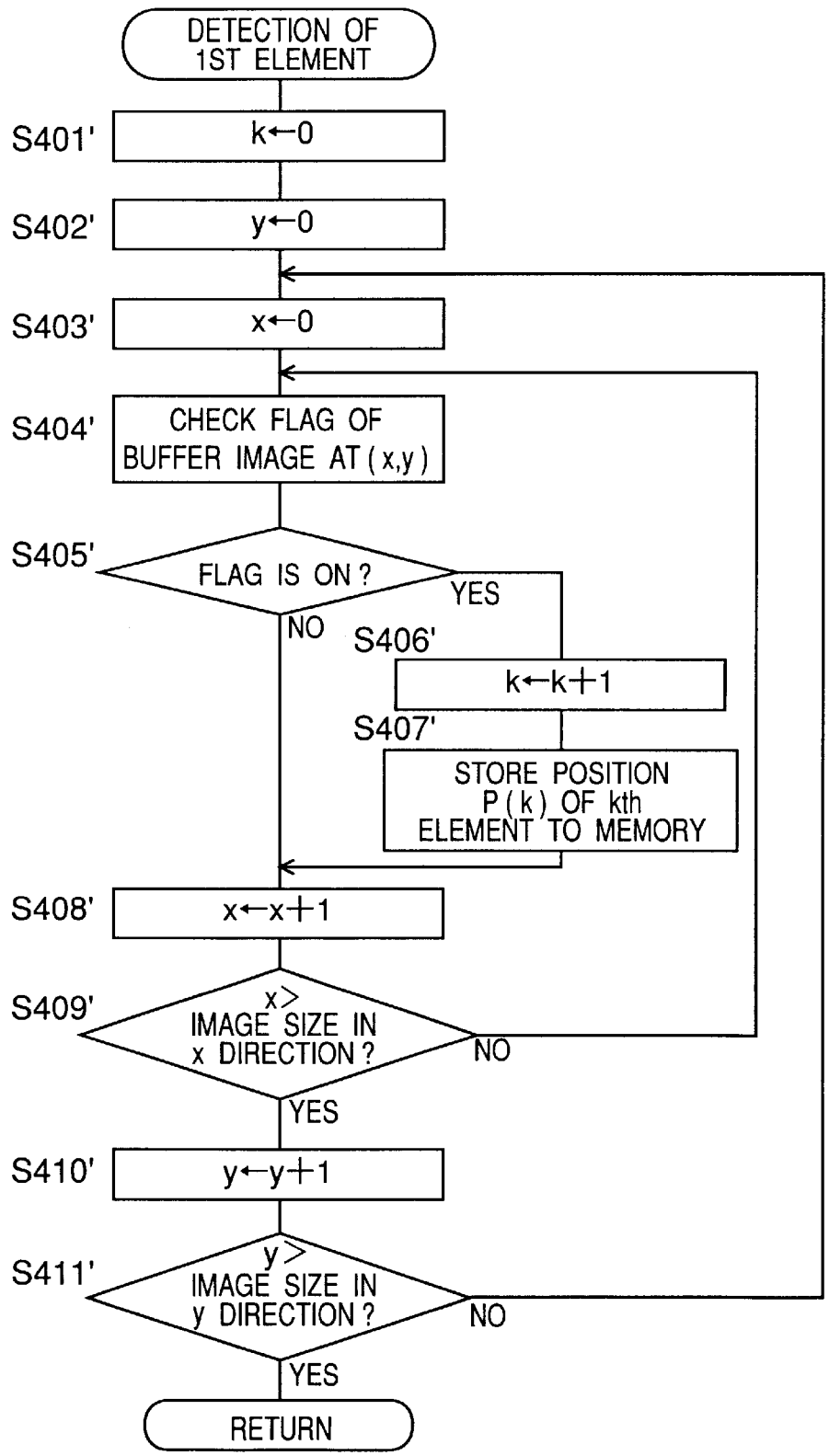
FIG. 19 is a flowchart showing a process of detecting a first element according to the second embodiment.

FIG. 19 is a flowchart showing the process of detecting a first element (step S1341) according to the present embodiment. In the present process, all the elements included in the image 20 are detected by referring to the buffer image 25 and are set to the first element candidates.

First of all, therefore, a variable k indicative of the number of the first element candidates is initialized to 0 (S401'). The y coordinate of the scanning position is set to 0 such that the scanning position is placed on the upper end of the image 25 (S402'). The x coordinate of the scanning position is set to 0 such that the scanning position is placed on the left end of the image 25 (S403'). The flag (pixel) of the buffer image 25 in the set position (x, y) is examined (S404') to decide whether or not the flag is ON (S405'). When the flag is ON, it is decided that the element is detected in that position and the variable k is incremented (S406'), and the position of the detected element is stored as kth element position information P(k) in the predetermined region of the RAM 204 (S407'). When the flag is OFF, that is, no element is detected, the steps S406' and S407' are skipped.

Next, the scanning position is shifted by one pixel in the x direction (S408'). Then, it is decided whether or not the scanning position gets out of the right end of the buffer image 25 (S409'). When the scanning position does not get out of the right end of the buffer image 25, the routine returns to the step S404' where an element is detected in a new position shifted in the x direction. When the scanning position gets out of the right end of the buffer image 25, the scanning position is shifted by one line in the y direction (S410') and it is decided whether or not the scanning position gets out of the lower end of the buffer image 25 (S411'). When the scanning position does not get out of the lower end of the buffer image 25, the routine returns to the step S403' where the process of detecting an element is carried out in a new position shifted by one line in the y direction on the left end of the buffer image 25. When the scanning position gets out of the lower end of the buffer image 25, the routine returns. Thus, while the buffer image 25 being scanned, the above-mentioned process (S403' to S411') are repeated until the scanning operation for the element detection is completed for the whole regions of the buffer image 25.

A process of detecting a second element and a process of detecting residual elements are the same as the process shown in the flowcharts of FIGS. 11 and 12 according to the first embodiment.

As described above, the image processing apparatus according to the present embodiment detects all elements from an image by means of a predetermined filter when retrieving, from the image, a layout pattern comprising a plurality of elements having a constant relative positional relationship therebetween and capable of being specified depending on the positional relationship, and once stores element detection position information in the element position holding means. Then, the image processing apparatus detects two elements giving a maximum distance therebetween by referring to the element position holding means, specifies the positions where the other elements are to be present based on the positional relationship between the elements, and recognizes that the layout pattern is present in the image when the other elements can be detected in the specified position.

Consequently, it is sufficient that only the position information is stored as a reference pattern to be referred to during the retrieval. Therefore, the layout pattern can be retrieved with a small amount of information. Moreover, if the two elements are determined, the positions of the residual elements can be calculated. Therefore, the residual elements can be retrieved in the vicinity of the calculated positions. That is, search region can be restricted. Consequently, the time required for the retrieval process can be shortened. By selecting first two elements having a maximum distance therebetween, therefore, an error made during the calculation of the positions of the residual elements is also reduced. Furthermore, since the layout pattern is detected based on the relative positional relationship between the elements, the layout pattern can be detected irrespective of the direction of the layout pattern in the image.

Numerous modifications and alternative embodiments of the invention will be apparent to those skilled in the art in view of the foregoing description. Accordingly, this description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

What is claimed is:

1. An image processing apparatus for retrieving a pattern from an image, the pattern comprising a plurality of elements having a specific positional relationship with each other, the apparatus comprising:
    a reference element detecting unit for detecting a plurality of elements from the image, and for specifying two of the detected elements as candidate elements of the pattern;
    an element position calculating unit for calculating positions of residual elements of the pattern other than elements of the pattern that correspond to the two specified elements based on coordinates of the two specified elements;
    a residual element verifying unit for verifying residual detected elements, which are the detected elements not specified by the reference element detecting unit, in the positions calculated by the element position calculating unit; and
    a pattern retrieving unit for retrieving the pattern based on the two specified elements detected by the reference element detecting unit and the residual elements detected by the residual element detecting unit.

2. The image processing apparatus according to claim 1, wherein the reference element detecting unit specifies the two elements having a maximum distance therebetween.

3. The image processing apparatus according to claim 1, wherein the reference element detecting unit specifies the two elements placed apart from each other by a predetermined distance.

4. The image processing apparatus according to claim 1, wherein by exchanging the coordinates of the two specified elements, the element position calculating unit calculates the positions of the residual elements in a pattern obtained by rotating, by 180 degrees, the pattern from which two specified elements are detected.

5. An image processing method for retrieving a pattern from an image, the pattern comprising a plurality of elements having a specific positional relationship with each other, the method comprising:
    detecting a plurality of the elements from the image;
    specifying two of the detected elements as candidate elements of the pattern based on an amount of distance between the two detected elements;
    calculating positions of residual elements of the pattern other than elements of the pattern that correspond to the two specified elements based on coordinates of the two specified elements;
    verifying that residual detected elements other than the specified elements are in the calculated positions; and
    retrieving the pattern based on the two specified elements and the detected residual elements.

6. The image processing method according to claim 5, wherein specifying two of the elements from the image comprises detecting two elements having a maximum distance therebetween.

7. The image processing method according to claim 5, wherein specifying two of the elements from the image comprises detecting two elements placed apart from each other by a predetermined distance.

8. The image processing method according to claim 5, wherein calculating positions of residual elements comprises, by exchanging the coordinates of the two specified elements, calculating the positions of residual elements in a pattern obtained by rotating, by 180 degrees, the pattern from which two elements are specified.

9. A computer readable recording medium in which a program for controlling the computer to retrieve a pattern from an image is recorded, the pattern comprising a plurality of elements having a specific positional relationship with each other, the program being capable of executing the following functions:
    a reference element detecting function for detecting a plurality of elements from the image, and for specifying two of the detected elements as candidate elements of the pattern;
    an element position calculating function for calculating positions of residual elements of the pattern other than elements of the pattern that correspond to the two specified detected elements based on coordinates of the two detected elements;
    a residual element verifying function for verifying residual detected elements, which are the detected elements not specified by the reference element detecting unit, in the positions calculated by the element position calculating function; and
    a pattern retrieving function for retrieving the pattern based on the two specified elements detected by the reference element detecting function and the residual elements detected by the residual element detecting function.

10. The recording medium according to claim 9, wherein the reference element detecting function specifies the two elements having a maximum distance therebetween.

11. The recording medium according to claim 9, wherein the reference element detecting function specifies the two elements placed apart from each other by a predetermined distance.

12. The recording medium according to claim 9, wherein by exchanging the coordinates of the two specified elements, the element position calculating function calculates the positions of the residual elements in a pattern obtained by rotating, by 180 degrees, the pattern from which two specified elements are detected.

13. An image processing apparatus for retrieving a specific pattern from an image, the apparatus comprising:

a unit for setting a size of a search region of which a size in a vertical scanning direction is greater than a size of the specific pattern in the direction by a first amount or more, and a size in a horizontal scanning direction is greater than the size of the specific pattern in the direction by a second amount or more;

a unit for determining a position of the search region by moving the search region by the first amount in the vertical scanning direction during vertical scanning and moving the search region by the second amount in the horizontal scanning direction during the horizontal scanning; and a unit for retrieving the specific pattern in the search region of which position is determined.

14. An image processing method for retrieving a specific pattern from an image, comprising:

setting a size of a search region of which a size in a vertical scanning direction is greater than a size of the specific pattern in the direction by a first amount or more, and a size in a horizontal scanning direction is greater than the size of the specific pattern in the direction by a second amount or more;

determining a position of the search region by moving the search region by the first amount in the vertical scanning direction during vertical scanning and moving the search region by the second amount in the horizontal scanning direction during the horizontal scanning; and retrieving the specific pattern in the search region of which position is determined.

15. A computer readable recording medium in which a program for controlling the computer to retrieve a specific pattern from an image is recorded, the program being capable of executing the following functions:

a function for setting a size of a search region of which a size in a vertical scanning direction is greater than a size of the specific pattern in the direction by a first amount or more, and a size in a horizontal scanning direction is greater than the size of the specific pattern in the direction by a second amount or more;

a function for determining a position of the search region by moving the search region by the first amount in the vertical scanning direction during vertical scanning and moving the search region by the second amount in the horizontal scanning direction during the horizontal scanning; and a function for retrieving the specific pattern in the search region of which position is determined.

16. An image processing apparatus for retrieving a pattern image from an object image, the pattern image comprising a plurality of elements having a specific positional relationship with each other, the apparatus comprising:

a reference pattern holding unit for holding, as a reference pattern, information about positions of the elements comprised by the pattern image;

a detecting unit for detecting all the elements existing in the object image;

a position information holding unit for holding information about the positions of the elements in the object image, which are detected by the detecting unit; and a pattern specifying unit for collating the position information of the elements comprised by the pattern image held in the reference pattern holding unit with the position information of the elements in the object image held in the position information holding unit, and thereby determining whether the pattern image exists in the object image.

17. The image processing apparatus according to claim 16, wherein the detecting unit detects an element by scanning the object image while shifting a filter for detecting the element by a predetermined amount.

18. The image processing apparatus according to claim 16, wherein in a case where an element is constituted by a connecting region which comprises continuous pixels having the same pixel value, the detecting unit detects the connecting region from the object image, and decides that the connecting region is the element when the detected connecting region satisfies a predetermined condition.

19. The image processing apparatus according to claim 16, wherein the position information holding unit comprises a map image having the same resolution as in the object image, and a pixel of the map image provided in a position corresponding to an element detected by the detecting unit is labeled.

20. The image processing apparatus according to claim 16, wherein the position information holding unit comprises a unit for storing coordinates of the position of the elements detected by the detecting unit.

21. The image processing apparatus according to claim 16, wherein in a case in which a pixel value of each pixel constituting the object image is expressed by a plurality of bits, the position information holding unit comprises one bit of the plurality of bits such that the one bit for one pixel placed in the vicinity of the element detected by the detecting unit is set to a predetermined value.

22. An image processing method for retrieving a pattern image from an object image, the pattern image comprising a plurality of elements having a specific positional relationship with each other, the method comprising:

holding, as a reference pattern, information about positions of the elements comprised by the pattern image;

detecting all of the elements existing in the object image;

holding information about the positions of the elements detected in the object image;

collating the held position information of the elements comprised by the pattern image with the held position information of the elements in the object image; and determining whether the pattern image exists in the object image.

23. The image processing method according to claim 22, wherein detecting all the elements comprises detecting an element by scanning the object image while shifting a filter for detecting the element by a predetermined amount.

24. The image processing method according to claim 22, wherein in a case where the element is constituted by a connecting region which comprises continuous pixels having the same pixel value, detecting all the elements comprises detecting the connecting region from the object image, and deciding that the connecting region is the element when the detected connecting region satisfies a predetermined condition.

25. The image processing method according to claim 22, wherein holding information comprises using a map image having the same resolution as in the object image, and a pixel of the map image provided in a position corresponding to an element detected by detecting all the elements is labeled.

26. The image processing method according to claim 22, wherein holding information comprises storing coordinates of the position of the elements detected by detecting the elements.

27. The image processing method according to claim 22, wherein in a case in which a pixel value of each pixel constituting the object image is expressed by a plurality of bits, holding information comprises using one bit of the plurality of bits such that the one bit for one pixel placed in the vicinity of the element detected by the detecting unit is set to a predetermined value.

28. A computer readable recording medium in which a program for controlling the computer to retrieve a pattern image from an object image is recorded, the pattern image including a plurality of elements having a specific positional relationship with each other, the program being capable of executing the following functions:
- a reference pattern holding function for holding, as a reference pattern, information about positions of the elements comprised by the pattern image;
- a detecting function for detecting all of the elements existing in the object image;
- a position information holding function for holding information about the positions of the elements in the object image, which are detected by the detecting function; and
- a pattern specifying function for collating the position information of the elements comprised by the pattern image held by the reference pattern holding function with the position information of the elements in the object image held by the position information holding function, and determining whether the pattern image exists in the object image.

29. The recording medium according to claim 28, wherein the detecting function detects an element by scanning the object image while shifting a filter for detecting the element by a predetermined amount.

30. The recording medium according to claim 28, wherein in a case where the element is constituted by a connecting region which comprises continuous pixels having the same pixel value, the detecting function detects the connecting region from the object image, and decides that the connecting region is the element when the detected connecting region satisfies a predetermined condition.

31. The recording medium according to claim 28, wherein the position information holding function comprises a function for using a map image having the same resolution as in the object image, and a pixel of the map image provided in a position corresponding to an element detected by the detecting function is labeled.

32. The recording medium according to claim 28, wherein the position information holding function comprises a function for storing coordinates of the position of the elements detected by the detecting function.

33. The recording medium according to claim 28, wherein in a case in which a pixel value of each pixel constituting the object image is expressed by a plurality of bits, the position information holding function comprises a function for using one bit of the plurality of bits such that the one bit for one pixel placed in the vicinity of the element detected by the detecting function is set to a predetermined value.

* * * * *